(12) United States Patent
Goto et al.

(10) Patent No.: US 12,315,879 B2
(45) Date of Patent: May 27, 2025

(54) LITHIUM BORATE COMPOUND, ADDITIVE FOR LITHIUM SECONDARY BATTERY, NONAQUEOUS ELECTROLYTIC SOLUTION FOR LITHIUM SECONDARY BATTERY, PRECURSOR FOR LITHIUM SECONDARY BATTERY, AND PRODUCTION METHOD FOR LITHIUM SECONDARY BATTERY

(71) Applicant: MITSUI CHEMICALS, INC., Tokyo (JP)

(72) Inventors: Kenichi Goto, Tokyo (JP); Shigeru Mio, Chiba (JP); Satoko Fujiyama, Kisarazu (JP); Kei Sugawara, Ichihara (JP); Mitsuaki Chida, Mobara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 627 days.

(21) Appl. No.: 17/438,629

(22) PCT Filed: Mar. 12, 2020

(86) PCT No.: PCT/JP2020/010966
§ 371 (c)(1),
(2) Date: Sep. 13, 2021

(87) PCT Pub. No.: WO2020/184690
PCT Pub. Date: Sep. 17, 2020

(65) Prior Publication Data
US 2022/0231336 A1 Jul. 21, 2022

(30) Foreign Application Priority Data
Mar. 14, 2019 (JP) .................................. 2019-046971

(51) Int. Cl.
 *H01M 10/0567* (2010.01)
 *H01M 10/0525* (2010.01)
 *H01M 10/0569* (2010.01)

(52) U.S. Cl.
CPC ... *H01M 10/0567* (2013.01); *H01M 10/0525* (2013.01); *H01M 10/0569* (2013.01); *H01M 2300/0025* (2013.01)

(58) Field of Classification Search
CPC ......... H01M 10/0567; H01M 10/0525; H01M 10/0568; H01M 10/0569
(Continued)

(56) References Cited

U.S. PATENT DOCUMENTS

| 5,626,981 A | 5/1997 | Simon et al. |
| 2010/0209782 A1 | 8/2010 | Choi et al. |

(Continued)

FOREIGN PATENT DOCUMENTS

| JP | 2000243437 A | 9/2000 |
| JP | 2002343428 A | 11/2002 |

(Continued)

OTHER PUBLICATIONS

KGAA, "Compounds Containing Perfluoroalkyl-Cyanoalkoxy-Borate Anions or Perfluoroalkyl-Cyano-Alkoxyfluoro-Borate Anions", Database Reaxys [Online], Jan. 1, 2015, (2 pages). (Cited in Office Action issued Jun. 30, 2023, in corresponding European Patent Application No. 20 769 134.6).

(Continued)

*Primary Examiner* — Jonathan G Leong
*Assistant Examiner* — John S Medley
(74) *Attorney, Agent, or Firm* — BUCHANAN INGERSOLL & ROONEY PC

(57) ABSTRACT

A lithium borate compound represented by the following Formula (I). In Formula (I), each of $R^1$, $R^2$, and $R^3$ inde- (Continued)

pendently represents a hydrocarbon group having from 1 to 20 carbon atoms, which may have a substituent. $R^{10}$ represents a fluorine atom, a hydrocarbon-oxy group having from 1 to 10 carbon atoms, a hydrocarbon group having from 1 to 10 carbon atoms, or a fluorinated hydrocarbon group having from 1 to 10 carbon atoms.

12 Claims, 3 Drawing Sheets

(58) Field of Classification Search
USPC .......................................................... 429/338
See application file for complete search history.

(56) References Cited

U.S. PATENT DOCUMENTS

| | | | |
|---|---|---|---|
| 2014/0066640 A1 | 3/2014 | Prakash et al. | |
| 2015/0140421 A1 | 5/2015 | Ihara et al. | |
| 2017/0229736 A1 | 8/2017 | Shimanuki et al. | |
| 2018/0034102 A1* | 2/2018 | Sakaguchi | H01M 10/052 |
| 2020/0014065 A1* | 1/2020 | Liu | H01M 4/364 |
| 2023/0131127 A1* | 4/2023 | Mu | H01M 4/587 429/341 |
| 2023/0192727 A1* | 6/2023 | Kim | H01M 10/0525 548/405 |

FOREIGN PATENT DOCUMENTS

| | | | | |
|---|---|---|---|---|
| JP | 3573521 | B2 | 7/2004 | |
| JP | 3722685 | B2 | 11/2005 | |
| JP | 3730855 | B2 | 1/2006 | |
| JP | 200827766 | A * | 2/2008 | ............ H01M 10/05 |
| JP | 2008027766 | A | 2/2008 | |
| JP | 4306858 | B2 * | 8/2009 | ............ Y02E 60/10 |
| JP | 2010192430 | A | 9/2010 | |
| JP | 2014519486 | A | 8/2014 | |
| JP | 2015103288 | A | 6/2015 | |
| JP | 2016533624 | A | 10/2016 | |
| JP | 2017-152262 | A | 8/2017 | |
| JP | 2017-168347 | A | 9/2017 | |
| WO | 2011/085967 | A1 | 7/2011 | |
| WO | 2015/007586 | A1 | 1/2015 | |
| WO | 2015/007659 | A1 | 1/2015 | |
| WO | 2016/021596 | A1 | 2/2016 | |
| WO | WO-2016074756 | A1 * | 5/2016 | ............... C07F 5/02 |
| WO | 2018/099698 | A1 | 6/2018 | |

OTHER PUBLICATIONS

Wan, Shun, et al., "A stable fluorinated and alkylated lithium malonatoborate salt for lithium ion battery application", Chemical Communications, vol. 51, No. 48, Jan. 1, 2015, pp. 9817-9820, XP055381396. (Cited in Extended European Search Report issued Nov. 29, 2022, for EP Application No. 20769134.6).

Zygadlo-Monikowska E, et al., "Oligomeric lithium borate salts and their application and polymeric electrolyte with oligomeric lithium borate salts—PL 212151 B1", Jan. 1, 2012, 3 pages, XP093000510. (Cited in Extended European Search Report issued Nov. 29, 2022, for EP Application No. 20769134.6).

Sprenger, Jan A.P., et al., "Convenient synthesis of perfluoroalkyltrifluoroborates", Journal of Fluorine Chemistry, Elsevier, NL, vol. 206, Dec. 7, 2017, pp. 54-60, XP085337468. (Cited in Extended European Search Report issued Nov. 29, 2022, for EP Application No. 20769134.6).

Kolomeitsev, A. A., et al., "Perfluoroalkyl borates and boronic esters: new promising partners for Suzuki and Petasis reactions", Tetrahedron Letters, Elsevier, Amsterdam, NL, vol. 44, No. 45, Nov. 3, 2003, pp. 8273-8277, XP004463842. (Cited in Extended European Search Report issued Nov. 29, 2022, for EP Application No. 20769134.6).

Wei Lu, et al., "Effects of carbon-chain length of trifluoroacetate co-solvents for lithium-ion battery electrolytes using at low temperature", Journal of Fluorine Chemistry, vol. 156, (2013), pp. 136-143.

Wei Lu, et al., "Preparation and characterization of trifluoroethyl aliphatic carboxylates as co-solvents for the carbonate-based electrolyte of lithium-ion batteries", Journal of Fluorine Chemistry, vol. 161, (2014), pp. 110-119.

Wei Lu, et al., "A new co-solvent for wide temperature lithium ion battery electrolytes: 2,2,2-Trifluoroethyl n-caproate", Journal of Power Source, vol. 274, (2015), pp. 667-684.

* cited by examiner

LITHIUM BORATE COMPOUND, ADDITIVE FOR LITHIUM SECONDARY BATTERY, NONAQUEOUS ELECTROLYTIC SOLUTION FOR LITHIUM SECONDARY BATTERY, PRECURSOR FOR LITHIUM SECONDARY BATTERY, AND PRODUCTION METHOD FOR LITHIUM SECONDARY BATTERY

TECHNICAL FIELD

The present disclosure relates to a novel lithium borate compound, an additive for a lithium secondary battery, a nonaqueous electrolyte solution for a lithium secondary battery, a lithium secondary battery precursor, and a method of manufacturing a lithium secondary battery.

BACKGROUND ART

Lithium borate compounds are used, for example, in the field of electrochemistry.

For example, an electrolyte solution for a lithium ion battery including lithium bis(oxalato)borate as an electrolyte, is known (See, for example, Patent Document 1). Furthermore, for example, an electrolyte solution for a lithium ion battery including lithium difluoro(oxalato)borate as an electrolyte, is also known (See, for example, Patent Document 2).

Patent Document 1: Japanese Patent No. 3730855
Patent Document 2: Japanese Patent No. 3722685

SUMMARY OF INVENTION

Technical Problem

An object of one aspect of the present disclosure is to provide a novel lithium borate compound; and an additive for a lithium secondary battery that includes the lithium borate compound.

An object of another aspect of the present disclosure is to provide a nonaqueous electrolyte solution for a lithium secondary battery that is capable of reducing battery resistances after storage and after charge-discharge cycles; a lithium secondary battery precursor including the nonaqueous electrolyte solution for a lithium secondary battery; and a method of manufacturing a lithium secondary battery using the lithium secondary battery precursor.

Solution to Problem

A solution to the problems described above includes the following aspects.

<1> A lithium borate compound represented by the following Formula (I):

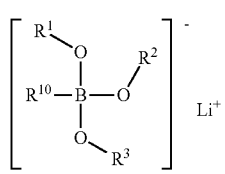

(I)

wherein, in Formula (I), each of $R^1$, $R^2$, and $R^3$ independently represents a hydrocarbon group having from 1 to 20 carbon atoms, which may have a substituent; and $R^{10}$ represents a fluorine atom, a hydrocarbon-oxy group having from 1 to 10 carbon atoms, a hydrocarbon group having from 1 to 10 carbon atoms, or a fluorinated hydrocarbon group having from 1 to 10 carbon atoms.

<2> The lithium borate compound according to <1>, wherein $R^{10}$ is a fluorine atom, an alkoxy group having from 1 to 3 carbon atoms, an alkyl group having from 1 to 3 carbon atoms, or a perfluoroalkyl group having from 1 to 3 carbon atoms.

<3> The lithium borate compound according to <1> or <2>, wherein $R^{10}$ is a trifluoromethyl group.

<4> The lithium borate compound according to any one of <1> to <3>, wherein each of $R^1$, $R^2$, and $R^3$ independently represents a methyl group, an ethyl group, an n-propyl group, an isopropyl group, an n-butyl group, an isobutyl group, a sec-butyl group, a tert-butyl group, a vinyl group, an allyl group, an ethynyl group, a phenyl group, or a 4-fluorophenyl group.

<5> The lithium borate compound according to any one of <1> to <4>, which is a lithium borate compound represented by the following Formula (II), the following Formula (III), the following Formula (IV), or the following Formula (V).

(II)

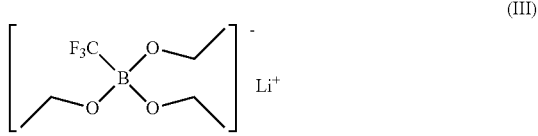

(III)

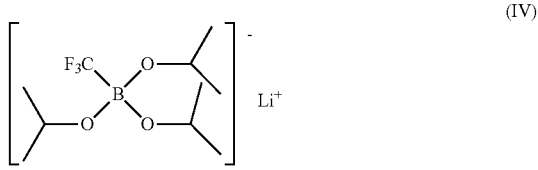

(IV)

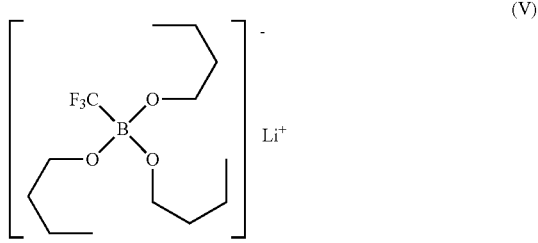

(V)

<6> An additive for a lithium secondary battery, the additive including the lithium borate compound according to any one of <1> to <5>.

<7> A nonaqueous electrolyte solution for a lithium secondary battery, the solution including: an electrolyte that is a lithium salt including fluorine; a nonaqueous solvent; and the lithium borate compound according to any one of <1> to <5>.

<8> The nonaqueous electrolyte solution for a lithium secondary battery according to <7>, wherein a content of the lithium borate compound is from 0.1% by mass to 5.0% by mass with respect to the total amount of the nonaqueous electrolyte solution for a lithium secondary battery.

<9> The nonaqueous electrolyte solution for a lithium secondary battery according to <7> or <8>, further including a cyclic carbonate ester having an unsaturated bond.

<10> The nonaqueous electrolyte solution for a lithium secondary battery according to <9>, wherein the cyclic carbonate ester having an unsaturated bond is vinylene carbonate.

<11> The nonaqueous electrolyte solution for a lithium secondary battery according to <10>, wherein a ratio of a content by mass of the vinylene carbonate to a content by mass of the lithium borate compound is in a range of from 0.1 to 10.

<12> A lithium secondary battery precursor, including:
a case; and
a positive electrode, a negative electrode, a separator, and an electrolyte solution that are housed in the case, wherein:
the positive electrode is a positive electrode that is configured to intercalate and de-intercalate lithium ions,
the negative electrode is a negative electrode that is configured to intercalate and de-intercalate lithium ions, and
the electrolyte solution is the nonaqueous electrolyte solution for a lithium secondary battery according to any one of <7> to <11>.

<13> A method of manufacturing a lithium secondary battery, the method including: preparing the lithium secondary battery precursor according to <12>; and subjecting the lithium secondary battery precursor to an aging treatment, thereby obtaining a lithium secondary battery, wherein: the aging treatment includes charging and discharging the lithium secondary battery precursor in an environment of from 20° C. to 60° C.

Advantageous Effects of Invention

According to one aspect of the present disclosure, there are provided a novel lithium borate compound; and an additive for a lithium secondary battery, including the lithium borate compound.

In addition, according to another aspect of the present disclosure, there are provided: a nonaqueous electrolyte solution for a lithium secondary battery that is capable of reducing battery resistances after storage and after charge-discharge cycles; a lithium secondary battery precursor including the nonaqueous electrolyte solution for a lithium secondary battery; and a method of manufacturing a lithium secondary battery using the lithium secondary battery precursor.

DESCRIPTION OF EMBODIMENTS

Figure 1:
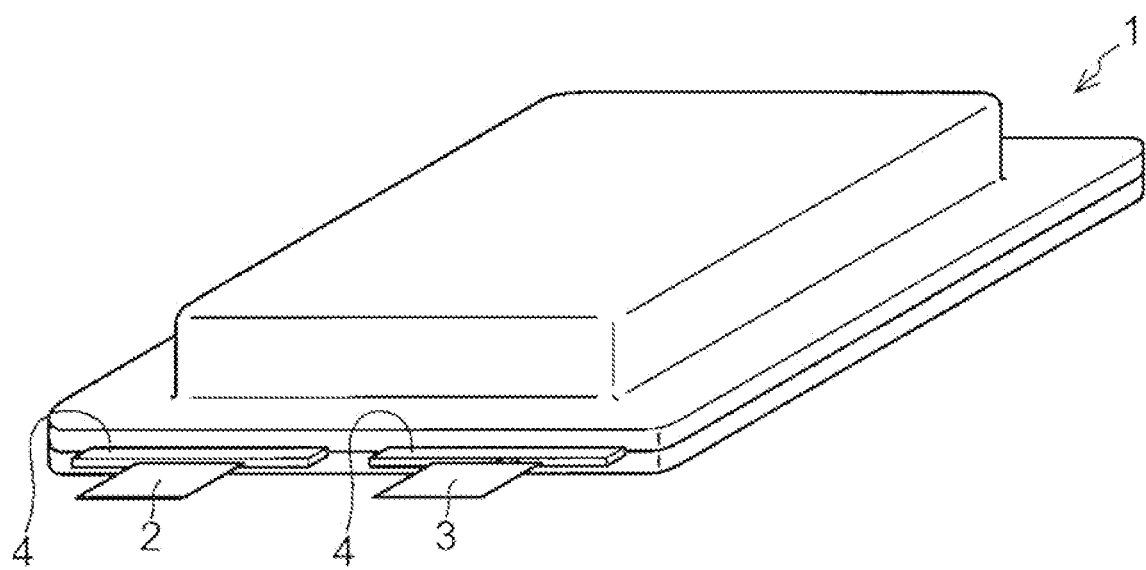
FIG. 1 is a schematic perspective view showing one example of a laminated-type battery, which is one example of a lithium secondary battery according to the present disclosure.

In the present specification, a numerical range represented by using "to" means a range including a numerical value described before "to" and a numerical value described after "to" as a lower limit value and an upper limit value, respectively.

In the present specification, in a case in which there are plural substances corresponding to each of a component present in a composition, unless otherwise specified, the amount of each of the component in the composition means the total amount of the plural substances present in the composition.

In the present specification, a term "step" includes not only an independent step but also a step that cannot be clearly distinguished from other steps as long as an intended purpose of the step is achieved.

[Lithium Borate Compound]

The lithium borate compound of the present disclosure is a novel lithium borate compound represented by the following Formula (I). Hereinafter, the lithium borate compound represented by Formula (I) is also simply referred to as a "lithium borate compound".

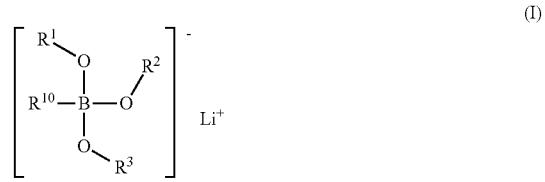

(I)

In Formula (I), each of $R^1$, $R^2$ and $R^3$ independently represents a hydrocarbon group having from 1 to 20 carbon atoms, which may have a substituent.

The hydrocarbon group having from 1 to 20 carbon atoms means that the number of carbon atoms in a skeleton that is composed only of a hydrocarbon group that does not include a substituent, is from 1 to 20.

In Formula (I), each of $R^1$, $R^2$, and $R^3$ independently is a hydrocarbon group having from 1 to 20 carbon atoms, which may have a substituent, two or more of $R^1$, $R^2$, and $R^3$ are preferably a hydrocarbon group having from 1 to 20 carbon atoms, which may have an identical substituent, and all three of $R^1$, $R^2$, and $R^3$ are more preferably a hydrocarbon group having from 1 to 20 carbon atoms, which may have an identical substituent.

Examples of the hydrocarbon group having from 1 to 20 carbon atoms, which may have a substituent, represented by $R^1$ to $R^3$, include: an aryl group having from 6 to 20 carbon atoms, which may have a substituent; and an aliphatic group having from 1 to 20 carbon atoms, which may have a substituent.

Examples of the aryl group having from 6 to 20 carbon atoms, which may have a substituent, include: a phenyl group; a group in which one hydrogen atom is removed from an alkylbenzene (e.g. a benzyl group, a tolyl group, a xylyl group, a mesityl group, etc.); a naphthyl group; a group in which one hydrogen atom is removed from an alkyl group-substitution of naphthalene.

Among the above, the aryl group having from 6 to 20 carbon atoms, which may have a substituent, is preferably a phenyl group, a 4-methylphenyl group, or a 4-fluorophenyl group, and is more preferably a phenyl group or a 4-fluorophenyl group.

In the aryl group having from 6 to 20 carbon atoms, which may have a substituent, examples of the substituent that the aryl group can have (hereinafter, also referred to as a "substituent that can be included in Formula (I)") include: a halogen atom, an unsubstituted alkyl group, a halogenated alkyl group, an unsubstituted alkoxy group, a halogenated alkoxy group, an unsubstituted alkenyl group, a halogenated alkenyl group, an unsubstituted alkynyl group, and a halogenated alkynyl group. Among the above, a halogen atom is preferable as the substituent that can be included in Formula (I).

The halogen atom as a substituent that can be included in Formula (I) is preferably a fluorine atom, a chlorine atom, a bromine atom, or an iodine atom, more preferably a fluorine atom, a chlorine atom, or a bromine atom, still more preferably a fluorine atom or a chlorine atom, and particularly preferably a fluorine atom.

Each of preferred embodiments of the halogen atom included in a structure of the halogenated alkyl group, the halogenated alkoxy group, the halogenated alkenyl group, and the halogenated alkynyl group as the substituent that can be included in Formula (I) is similar to the preferred embodiment of the halogen atom as the substituent that can be included in Formula (I).

The unsubstituted alkyl group as the substituent that can be included in Formula (I) is preferably an alkyl group having from 1 to 12 carbon atoms, more preferably an alkyl group having from 1 to 6 carbon atoms, and still more preferably an alkyl group having from 1 to 3 carbon atoms.

The unsubstituted alkoxy group as the substituent that can be included in Formula (I) is preferably an alkoxy group having from 1 to 12 carbon atoms, more preferably an alkoxy group having from 1 to 6 carbon atoms, and still more preferably an alkoxy group having from 1 to 3 carbon atoms.

The unsubstituted alkenyl group as the substituent that can be included in Formula (I) is preferably an alkenyl group having from 2 to 12 carbon atoms, more preferably an alkenyl group having from 2 to 6 carbon atoms, and still more preferably an alkenyl group having from 2 to 3 carbon atoms.

The unsubstituted alkynyl group as the substituent that can be included in Formula (I) is preferably an alkynyl group having from 2 to 12 carbon atoms, more preferably an alkynyl group having from 2 to 6 carbon atoms, and still more preferably an alkynyl group having from 2 to 3 carbon atoms.

A preferred range of the number of carbon atoms in each of the halogenated alkyl group, the halogenated alkoxy group, the halogenated alkenyl group, and the halogenated alkynyl group as the substituent that can be included in Formula (I) is similar to the preferred range of the number of carbon atoms in the unsubstituted alkyl group, the unsubstituted alkoxy group, the unsubstituted alkenyl group, and the unsubstituted alkynyl group as the substituent that can be included in Formula (I).

The aliphatic group having from 1 to 20 carbon atoms, which may have a substituent, may be a saturated aliphatic group (i.e. an alkyl group) or an unsaturated aliphatic group (i.e. an alkenyl group or an alkynyl group).

The aliphatic group having from 1 to 20 carbon atoms, which may have a substituent, may be linear, branched, or cyclic.

The aliphatic group having from 1 to 20 carbon atoms, which may have a substituent, is preferably an aliphatic group having from 1 to 16 carbon atoms, and more preferably an aliphatic group having from 1 to 12 carbon atoms.

Examples of the aliphatic group having from 1 to 12 carbon atoms include:

- a linear or a branched saturated aliphatic group (i.e. an alkyl group) such as a methyl group, an ethyl group, an n-propyl group, an isopropyl group, a 1-ethylpropyl group, an n-butyl group, an isobutyl group, a sec-butyl group, a tert-butyl group, a 2-methylbutyl group, a 3,3-dimethylbutyl group, an n-pentyl group, an isopentyl group, a neopentyl group, a 1-methylpentyl group, an n-hexyl group, an isohexyl group, a sec-hexyl group, a tert-hexyl group, an n-heptyl group, an isoheptyl group, a sec-heptyl group, a tert-heptyl group, an n-octyl group, an isooctyl group, a sec-octyl group, a tert-octyl group, a nonyl group, a decyl group, an undecyl group, or a dodecyl group;
- a linear or a branched unsaturated aliphatic group (i.e. an alkenyl group or an alkynyl group) such as a vinyl group, a 1-propenyl group, an allyl group (a 2-propenyl group), an isopropenyl group, a 1-butenyl group, a 2-butenyl group, a 3-butenyl group, a pentenyl group, a hexenyl group, a 2-methyl-2-propenyl group, a 1-methyl-2-propenyl group, a 2-methyl-1-propenyl group, a hexenyl group, an ethynyl group, a 1-propynyl group, a 2-propynyl group (synonymous with a propargyl group), a 1-butynyl group, a 2-butynyl group, a 3-butynyl group, a 1-pentynyl group, a 2-pentynyl group, a 3-pentynyl group, a 4-pentynyl group, a 5-hexynyl group, a 1-methyl-2-propynyl group, a 2-methyl-3-butynyl group, a 2-methyl-3-pentynyl group, a 1-methyl-2-butynyl group, a 1,1-dimethyl-2-propynyl group, a 1,1-dimethyl-2-butynyl group, or a 1-hexynyl group; and
- a cycloaliphatic group such as a cyclopropyl group, a cyclobutyl group, a cyclopentyl group, a cyclohexyl group, a cycloheptyl group, a 1-cyclopentenyl group, or a 1-cyclohexenyl group.

Among the above, the aliphatic group having from 1 to 12 carbon atoms represented by $R^1$ to $R^3$ is preferably a methyl group, an ethyl group, an n-propyl group, an isopropyl group, an n-butyl group, an isobutyl group, a sec-butyl group, a tert-butyl group, an n-hexyl group, an n-octyl group, a vinyl group, an allyl group, or an ethynyl group, and more preferably a methyl group, an ethyl group, an n-propyl group, an isopropyl group, an n-butyl group, an isobutyl group, a sec-butyl group, a tert-butyl group, a vinyl group, an allyl group, or an ethynyl group.

In the aliphatic group having from 1 to 20 carbon atoms, which can be included in Formula (I) and which may have a substituent, a substituent that the aliphatic group can have is similar to the preferred embodiment of the substituent that the aryl group can have described above.

Each of $R^1$, $R_2$, and $R^3$ in Formula (I) independently is preferably a methyl group, an ethyl group, an n-propyl group, an isopropyl group, an n-butyl group, an isobutyl group, a sec-butyl group, a tert-butyl group, a vinyl group, an allyl group, an ethynyl group, a phenyl group, or a 4-fluorophenyl group.

In Formula (I), $R^{10}$ represents a fluorine atom, a hydrocarbon-oxy group having from 1 to 10 carbon atoms, a hydrocarbon group having from 1 to 10 carbon atoms, or a fluorinated hydrocarbon group having from 1 to 10 carbon atoms.

The hydrocarbon-oxy group having from 1 to 10 carbon atoms represented by $R^{10}$ may be a linear hydrocarbon-oxy group, or may be a hydrocarbon-oxy group having a branched and/or a cyclic structure.

The number of carbon atoms of the hydrocarbon-oxy group having from 1 to 10 carbon atoms represented by $R^{10}$ is preferably from 1 to 6, more preferably from 1 to 3, still more preferably 1 or 2, and particularly preferably 1.

The hydrocarbon group having from 1 to 10 carbon atoms represented by $R^{10}$ may be a linear hydrocarbon group or may be a hydrocarbon group having a branched and/or a cyclic structure.

The hydrocarbon group having from 1 to 10 carbon atoms represented by $R^{10}$ is preferably an alkyl group or an aryl group, and still more preferably an alkyl group.

The number of carbon atoms of the hydrocarbon group having from 1 to 10 carbon atoms represented by $R^{10}$ is preferably from 1 to 6, more preferably from 1 to 3, still more preferably 1 or 2, and particularly preferably 1.

The fluorinated hydrocarbon group having from 1 to 10 carbon atoms represented by $R^{10}$ may be a linear fluorinated hydrocarbon group or may be a fluorinated hydrocarbon group having a branched and/or a cyclic structure.

The fluorinated hydrocarbon group having from 1 to 10 carbon atoms represented by $R^{10}$ is preferably a fluorinated alkyl group or a fluorinated aryl group, still more preferably a fluorinated alkyl group, still more preferably a perfluoroalkyl group, and particularly preferably a trifluoromethyl group ($—CF_3$).

Among the above, $R^{10}$ is preferably a fluorine atom, an alkoxy group having from 1 to 3 carbon atoms, an alkyl group having from 1 to 3 carbon atoms, or a perfluoroalkyl group having from 1 to 3 carbon atoms, and more preferably a trifluoromethyl group ($—CF_3$).

Preferable specific examples of the lithium borate compound represented by Formula (I) include: lithium borate compounds represented by the following Formula (II), the following Formula (III), the following Formula (IV), and the following Formula (V). However, a lithium borate compound represented by Formula (I) is not limited to this specific example.

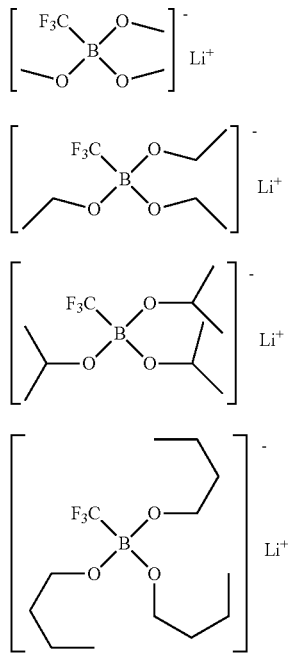

[One Example of Method of Manufacturing Lithium Borate Compound (Manufacturing Method X)]

Hereinafter, one example of the method of manufacturing the lithium borate compound of the present disclosure (manufacturing method X) will be described. However, the method of manufacturing the lithium borate compound of the present disclosure is not limited to the manufacturing method X.

The manufacturing method X includes: a first reaction step of reacting (trifluoromethyl)trimethylsilane, a potassium halide, and a borate ester compound in a solvent, thereby obtaining a potassium borate compound that is a reaction intermediate; and a second reaction step of reacting the potassium borate compound and a lithium halide in a solvent, thereby obtaining the lithium borate compound of the present disclosure.

Examples of the potassium halide in the first reaction step include potassium fluoride, potassium chloride, potassium bromide, and potassium iodide. Among them, potassium fluoride or potassium chloride are more preferable. The potassium halides may be used singly or in combination of two or more kinds thereof.

Examples of the borate ester compound in the first reaction step include: trimethyl borate, triethyl borate, tri-n-propyl borate, triisopropyl borate, tri-n-butyl borate, tri-isobutyl borate, tri-sec-butyl borate, tri-tert-butyl borate, trihexyl borate, tricyclohexyl borate, trioctyl borate, and triphenyl borate. Trimethyl borate, triethyl borate, tri-n-propyl borate, triisopropyl borate, tri-n-butyl borate, tricyclohexyl borate, triphenyl borate, or the like is preferable. Among them, trimethyl borate, triethyl borate, triisopropyl borate, or tri-n-butyl borate is more preferable. The borate ester compounds may be used singly, or in combination of two or more kinds thereof.

Examples of the lithium halide in the second reaction step include lithium fluoride, lithium chloride, lithium bromide, and lithium iodide. Among them, lithium fluoride or lithium chloride is more preferable. The lithium halides may be used singly, or in combination of two or more kinds thereof.

Examples of the solvent in the first reaction step and the second reaction step include a nonaqueous solvent such as acetone, ethyl acetate, acetonitrile, tetrahydrofuran, dimethyl carbonate, ethyl methyl carbonate, diethyl carbonate, methanol, ethanol, n-propanol, isopropanol, n-butanol, isobutanol, sec-butanol, tert-butanol, pentane, hexane, heptane, octane, nonane, decane, toluene, xylene (i.e. orthoxylene, metaxylene, or paraxylene), ethylbenzene, butylbenzene, pentylbenzene, hexylbenzene, heptylbenzene, propylbenzene, isopropylbenzene (also called cumene), cyclohexylbenzene, tetralin, mesitylene, methylcyclopentane, cyclohexane, methylcyclohexane, cycloheptane, cyclooctane, or cyclononane. The solvent may be used singly or in combination of two or more kinds thereof.

The first reaction step and the second reaction step may be conducted either under a normal pressure or under a reduced pressure.

The first reaction step and the second reaction step may be conducted either under an air atmosphere or under an inert atmosphere.

The first reaction step and the second reaction step are preferably conducted under an inert atmosphere (e.g. under an atmosphere of an inert gas such as nitrogen or argon), for example, from a viewpoint of preventing a contamination of a component (such as a moisture) that inhibits a production of the potassium borate compound and the lithium borate compound.

A reaction temperature in the first reaction step is preferably from 0° C. to 120° C., more preferably from 10° C. to 100° C., and still more preferably from 20° C. to 80° C.

A reaction time in the first reaction step is preferably from 30 minutes to 48 hours, and more preferably from 1 hour to 30 hours, from a viewpoint of efficiently producing the potassium borate compound.

A reaction temperature in the second reaction step is preferably from 10° C. to 150° C., more preferably from 20° C. to 120° C., and still more preferably from 40° C. to 100° C.

In a case in which a reaction temperature in the second reaction step is 10° C. or higher, a production of the lithium borate compound is likely to be promoted. In a case in which a reaction temperature in the second reaction step is 150° C. or lower, a decomposition of the generated lithium borate compound is suppressed, and thus a formation rate of the lithium borate compound is likely to be improved.

A reaction time in the second reaction step is preferably from 30 minutes to 12 hours, and more preferably from 30 minutes to 8 hours, from a viewpoint of efficiently producing the lithium borate compound.

The second reaction step may be an aspect in which the reaction solution obtained after the first reaction step is mixed as it is with the lithium halide, or may be an aspect in which a solid obtained after distilling off a product such as a halogenated trimethylsilane and a solvent from the reaction solution obtained after the first reaction step is mixed with the lithium halide.

There is no particular limitation for a method of extracting the lithium borate compound after the second reaction step.

For example, in a case in which only an intended component (i.e. the lithium borate compound per se) is obtained as a solid, the solid can be extracted as the lithium borate compound without any special treatment.

In a case in which a slurry in which the lithium borate compound is dispersed in the solvent is obtained by the second reaction step, the solvent is separated from the slurry by a solid-liquid separation such as a filtration, and the obtained filtrate is dried, whereby the lithium borate compound can be extracted.

In a case in which a solution in which the lithium borate compound is dissolved in the solvent is obtained by the second reaction step, the lithium borate compound can be extracted by distilling off the solvent from the solution by a heat concentration or the like.

Also in a case in which a solution in which the lithium borate compound is dissolved in the solvent is obtained by the second reaction step, a solvent not dissolving the lithium borate compound is added to the solution, whereby the lithium borate compound is allowed to precipitate, then the lithium borate compound precipitated from the solution is separated from the solvent by a solid-liquid separation, and the resultant solid is dried, whereby the lithium borate compound can be extracted.

As a method of drying the extracted lithium borate compound, a ventilation drying method using a shelf type drying machine; a fluidized drying method using a conical drying machine; a method of drying using an apparatus such as a hot plate or an oven; a method of supplying warm air or hot air with a drying machine such as a dryer, or the like can be applied.

A pressure at which the extracted lithium borate compound is dried may be either a normal pressure or a reduced pressure.

A temperature at which the extracted lithium borate compound is dried is preferably from 20° C. to 150° C., more preferably from 50° C. to 140° C., and still more preferably from 80° C. to 130° C.

In a case in which the temperature is 20° C. or higher, a drying efficiency is excellent. In a case in which the temperature is 150° C. or lower, a decomposition of the generated lithium borate compound is suppressed, and the lithium borate compound is stably and easily extracted.

The extracted lithium borate compound may be used as it is, or, for example, may be used as being dispersed or dissolved in a solvent, or may be used after being mixed with another solid material.

The lithium borate compound of the present disclosure can be usefully used for applications such as an additive for a lithium battery (preferably, an additive for a lithium secondary battery, more preferably, an additive for a non-aqueous electrolyte solution of a lithium secondary battery), a reaction agent, a synthetic reaction catalyst, an electrolyte for various electrochemical devices, a doping agent, or an additive for a lubricating oil.

[Additive for Lithium Secondary Battery]

An additive for a secondary battery of the present disclosure includes the above-described lithium borate compound of the present disclosure. The additive for a secondary battery of the present disclosure is suitable in particular as an additive for a nonaqueous electrolyte solution of a lithium secondary battery.

[Nonaqueous Electrolyte Solution for Lithium Secondary Battery]

A nonaqueous electrolyte solution for a lithium secondary battery according to an embodiment of the present disclosure (hereinafter, also simply referred to as a "nonaqueous electrolyte solution of the present embodiment") includes: an electrolyte that is a lithium salt including fluorine; a nonaqueous solvent; and the above-described lithium borate compound of the present disclosure.

According to the nonaqueous electrolyte solution of the present embodiment, a battery resistance after storage and after charge-discharge cycles can be reduced.

A nonaqueous electrolyte solution of the present embodiment (hereinafter, also simply referred to as a "nonaqueous electrolyte solution") includes a lithium borate compound.

The nonaqueous electrolyte solution of the present disclosure includes a lithium borate compound, whereby a battery resistance after storage and after charge-discharge cycles can be reduced.

The reason why the above-described effect is achieved is assumed as follows. However, the nonaqueous electrolyte solution of the present embodiment is not limited by the following reason.

In a case in which a lithium secondary battery is manufactured using the nonaqueous electrolyte solution of the present embodiment, in a process of manufacturing a lithium secondary battery (e.g. in an aging step described later), a reaction product of a lithium borate compound and LiF generated from the electrolyte is considered to be produced in a vicinity of a surface of a negative electrode of the lithium secondary battery, and furthermore a component that is a decomposition product of the reaction product, is considered to be produced. This component is considered, in the manufacturing process, to move to a vicinity of a surface of a positive electrode and the vicinity of the surface of the negative electrode, and to adhere to the surface of the positive electrode and the surface of the negative electrode to form a positive electrode coating film and a negative electrode coating film. Owing to this, a stability of the battery after storage and after charge-discharge cycles is improved (e.g. an elution of a metal element in a positive electrode active material is suppressed), and as a result of this, battery resistances after storage and after charge-discharge cycles are considered to be reduced.

Because of the above reasons, by using the nonaqueous electrolyte solution of the present embodiment, it is considered that battery resistances after storage and after charge-discharge cycles can be reduced.

It is considered that the adhesion of the component to the surfaces of the positive electrode and the negative electrode (i.e. a formation of the positive electrode coating film and the negative electrode coating film) described above still proceeds during a storage period in a case in which the lithium secondary battery is stored after the lithium secondary battery has been manufactured.

Hence, in a case in which the lithium secondary battery is stored, the battery resistance of the lithium secondary battery with respect to the storage period of the lithium secondary battery is considered to be reduced.

The nonaqueous electrolyte solution of the present disclosure may include only one kind of the lithium borate compounds, or may include two or more kinds thereof.

The nonaqueous electrolyte solution of the present disclosure may include the lithium borate compound as an additive for a battery, or may include the lithium borate compound as a supply source of an electrolyte.

A content of the lithium borate compound in the nonaqueous electrolyte solution of the present disclosure is not particularly limited, but is preferably from 0.1% by mass to 5.0% by mass with respect to the total amount of the nonaqueous electrolyte solution.

In a case in which the content of the lithium borate compound with respect to the total amount of the nonaqueous electrolyte solution is 0.1% by mass or more, the effect by the nonaqueous electrolyte solution of the present disclosure is more effectively achieved. The content of the lithium borate compound with respect to the total amount of the nonaqueous electrolyte solution is more preferably 0.2% by mass or more, still more preferably 0.3% by mass or more, and still more preferably 0.5% by mass or more.

In a case in which the content of the lithium borate compound with respect to the total amount of the nonaqueous electrolyte solution is 5.0% by mass or less, a chemical stability of the nonaqueous electrolyte solution is further improved.

The content of the lithium borate compound with respect to the total amount of the nonaqueous electrolyte solution is more preferably 3.0% by mass or less, still more preferably 2.0% by mass or less, and still more preferably 1.0% by mass or less.

In a case in which the nonaqueous electrolyte solution of the present disclosure includes the lithium borate compound as a supply source of an electrolyte, a concentration of the electrolyte is preferably from 0.1 mol/L to 3 mol/L, and more preferably from 0.5 mol/L to 2 mol/L.

In an actual analysis of a nonaqueous electrolyte solution collected by disassembling a battery, there may be a case in which the amount of the lithium borate compound is reduced as compared with the amount of the lithium borate compound added to the nonaqueous electrolyte solution. Therefore, in a case in which even a small amount of the lithium borate compound can be detected in a nonaqueous electrolyte solution extracted from a battery, the nonaqueous electrolyte solution is included in the scope of the nonaqueous electrolyte solution of the present disclosure.

Even in a case in which the lithium borate compound cannot be detected from a nonaqueous electrolyte solution, but a compound derived from a decomposition product of the lithium borate compound is detected in the nonaqueous electrolyte solution or in a coating film of an electrode, the nonaqueous electrolyte solution is also considered to be included in the scope of the nonaqueous electrolyte solution of the present disclosure.

The same applies to a compound, other than the lithium borate compound, that can be included in the nonaqueous electrolyte solution.

<Electrolyte>

The nonaqueous electrolyte solution of the present embodiment includes at least one electrolyte that is a lithium salt including fluorine (hereinafter, also referred to as a "fluorine-containing lithium salt").

Examples of the fluorine-containing lithium salt include;

an inorganic acid anion salt such as lithium hexafluorophosphate ($LiPF_6$), lithium tetrafluoroborate ($LiBF_4$), lithium hexafluoroarsenate ($LiAsF_6$), or lithium hexafluorotantalate ($LiTaF_6$); and an organic acid anion salt such as lithium trifluoromethanesulfonate ($LiCF_3SO_3$), lithium bis(fluorosulfonyl)imide ($Li(FSO_2)_2N$), lithium bis(trifluoromethanesulfonyl)imide ($Li(CF_3SO_2)_2N$), or lithium bis(pentafluoroethanesulfonyl)imide ($Li(C_2F_5SO_2)_2N$).

As the fluorine-containing lithium salt, $LiPF_6$ is particularly preferable.

The nonaqueous electrolyte solution of the present embodiment may include an electrolyte which is a lithium salt that does not include fluorine.

Examples of the lithium salt that does not include fluorine include: lithium perchlorate ($LiClO_4$), lithium aluminum tetrachloride ($LiAlCl_4$), and lithium decachlorodecaborate ($Li_2B_{10}Cl_{10}$).

A percentage of the fluorine-containing lithium salt in the entire electrolytes included in the nonaqueous electrolyte solution of the present embodiment is preferably from 50% by mass to 100% by mass, more preferably from 60% by mass to 100% by mass, and still more preferably from 80% by mass to 100% by mass.

A percentage of $LiPF_6$ in the entire electrolytes included in the nonaqueous electrolyte solution of the present embodiment is preferably from 50% by mass to 100% by mass, more preferably from 60% by mass to 100% by mass, and still more preferably from 80% by mass to 100% by mass.

A concentration of electrolytes in the nonaqueous electrolyte solution of the present embodiment is preferably from 0.1 mol/L to 3 mol/L, and more preferably from 0.5 mol/L to 2 mol/L.

A concentration of $LiPF_6$ in the nonaqueous electrolyte solution of the present embodiment is preferably from 0.1 mol/L to 3 mol/L, and more preferably from 0.5 mol/L to 2 mol/L.

<Nonaqueous Solvent>

The nonaqueous electrolyte solution of the present embodiment includes at least one nonaqueous solvent.

Examples of the nonaqueous solvent include: a cyclic carbonate, a fluorine-containing cyclic carbonate, a chain carbonate, a fluorine-containing chain carbonate, an aliphatic carboxylate ester, a fluorine-containing aliphatic carboxylate ester, a γ-lactone, a fluorine-containing γ-lactone, a cyclic ether, a fluorine-containing cyclic ether, a chain ether, a fluorine-containing chain ether, a nitrile, an amide, a lactam, nitromethane, nitroethane, sulfolane, trimethyl phosphate, dimethyl sulfoxide, and dimethyl sulfoxide phosphoric acid.

Examples of the cyclic carbonate include: ethylene carbonate (EC), propylene carbonate (PC), and butylene carbonate (BC).

Examples of the fluorine-containing cyclic carbonate include fluoroethylene carbonate (FEC).

Examples of the chain carbonate include: dimethyl carbonate (DMC), diethyl carbonate (DEC), ethyl methyl carbonate (EMC), methyl propyl carbonate (MPC), ethyl propyl carbonate (EPC), and dipropyl carbonate (DPC).

Examples of the aliphatic carboxylate ester include: methyl formate, methyl acetate, methyl propionate, methyl butyrate, methyl isobutyrate, methyl trimethylbutyrate, ethyl formate, ethyl acetate, ethyl propionate, ethyl butyrate, ethyl isobutyrate, and ethyl trimethylbutyrate.

Examples of the γ-lactone include: γ-butyrolactone, and γ-valerolactone.

Examples of the cyclic ether include: tetrahydrofuran, 2-methyltetrahydrofuran, tetrahydropyran, 1,3-dioxolane, 4-methyl-1,3-dioxolane, 1,3-dioxane, and 1,4-dioxane.

Examples of the chain ether include: 1,2-ethoxyethane (DEE), ethoxymethoxyethane (EME), diethyl ether, 1,2-dimethoxyethane, and 1,2-dibutoxyethane.

Examples of the nitrile include: acetonitrile, glutaronitrile, adiponitrile, methoxyacetonitrile, and 3-methoxypropionitrile.

Examples of the amide include N,N-dimethylformamide.

Examples of the lactam include: N-methylpyrrolidinone, N-methyloxazolidinone, and N,N'-dimethylimidazolidinone.

The nonaqueous solvent preferably includes at least one selected from the group consisting of a cyclic carbonate, a fluorine-containing cyclic carbonate, a chain carbonate, and a fluorine-containing chain carbonate.

In this case, a total percentage of the cyclic carbonate, the fluorine-containing cyclic carbonate, the chain carbonate, and the fluorine-containing chain carbonate in the nonaqueous solvent is preferably from 50% by mass to 100% by mass, more preferably from 60% by mass to 100% by mass, and still more preferably from 80% by mass to 100% by mass.

The nonaqueous solvent preferably includes at least one selected from the group consisting of a cyclic carbonate, and a chain carbonate.

In this case, a total percentage of the cyclic carbonate and the chain carbonate in the nonaqueous solvent is preferably from 50% by mass to 100% by mass, more preferably from 60% by mass to 100% by mass, and still more preferably from 80% by mass to 100% by mass.

A percentage of the nonaqueous solvent in the nonaqueous electrolyte solution of the present embodiment is preferably 60% by mass or more, and more preferably 70% by mass or more.

An upper limit of the percentage of the nonaqueous solvent in the nonaqueous electrolyte solution of the present embodiment depends on contents of other components (a lithium borate compound, an electrolyte, etc.), but the upper limit is, for example, 99% by mass, preferably 97% by mass, and still more preferably 90% by mass.

An intrinsic viscosity of the nonaqueous solvent is preferably 10.0 mPa·s or less at 25° C. from a viewpoint of further improving dissociability of the electrolyte and ionic mobility.

<Cyclic Carbonate Ester having Unsaturated Bond>

From a viewpoint of further improving a chemical stability of the nonaqueous electrolyte solution, the nonaqueous electrolyte solution of the present embodiment preferably includes at least one cyclic carbonate ester having an unsaturated bond.

In general, in a case in which the nonaqueous electrolyte solution includes a cyclic carbonate ester having an unsaturated bond, an internal resistance of a battery tends to easily increase.

However, since the nonaqueous electrolyte solution of the present embodiment includes a lithium borate compound, the internal resistance of the battery can be reduced even in a case in which the nonaqueous electrolyte solution further includes the cyclic carbonate ester having an unsaturated bond.

Rather, in a case in which the nonaqueous electrolyte solution of the present embodiment includes the cyclic carbonate ester having an unsaturated bond, there is an advantage that an improvement range of a reduction in the internal resistance by an addition of the lithium borate compound is wide.

Examples of the cyclic carbonate ester having an unsaturated bond include: a vinylene carbonate-based compound, a vinyl ethylene carbonate-based compound, and a methylene ethylene carbonate-based compound.

Examples of the vinylene carbonate-based compound include: vinylene carbonate (also called: 1,3-dioxol-2-one), methyl vinylene carbonate (also called: 4-methyl-1,3-dioxol-2-one), ethyl vinylene carbonate (also called: 4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one.

Examples of the vinyl ethylene carbonate-based compound include: vinyl ethylene carbonate (also called: 4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one.

Examples of the methylene ethylene carbonate-based compound include: 4-methylene-1,3-dioxolane-2-one, 4,4-dimethyl-5-methylene-1,3-dioxolane-2-one, and 4,4-diethyl-5-methyl ene-1,3-dioxolane-2-one.

As the cyclic carbonate ester having an unsaturated bond, vinylene carbonate is particularly preferable.

In a case in which the nonaqueous electrolyte solution of the present embodiment includes the cyclic carbonate ester having an unsaturated bond, a content of the cyclic carbonate ester having an unsaturated bond is preferably from 0.1% by mass to 5.0% by mass, more preferably from 0.2% by mass to 3.0% by mass, still more preferably from 0.2% by mass to 2.0% by mass, and still more preferably from 0.3% by mass to 1.0% by mass with respect to the total amount of the nonaqueous electrolyte solution.

In a case in which the nonaqueous electrolyte solution of the present embodiment includes vinylene carbonate, a content of vinylene carbonate is preferably from 0.1% by mass to 5.0% by mass, more preferably from 0.2% by mass to 3.0% by mass, still more preferably from 0.2% by mass to 2.0% by mass, and still more preferably from 0.3% by mass to 1.0% by mass with respect to the total amount of the nonaqueous electrolyte solution.

In a case in which the nonaqueous electrolyte solution of the present embodiment includes vinylene carbonate, a ratio of a content by mass of vinylene carbonate to a content by mass of the lithium borate compound (hereinafter, also referred to as a "content ratio by mass [vinylene carbonate/lithium borate compound]") is preferably 0.05 or more, more preferably 0.1 or more, and still more preferably 0.3 or more.

In a case in which the content ratio by mass [vinylene carbonate/lithium borate compound] is 0.05 or more, an increase in an internal resistance of a lithium secondary battery after storage can be further suppressed.

An upper limit of the content ratio by mass [vinylene carbonate/lithium borate compound] is not particularly limited, but is preferably 10 or less, more preferably 5 or less, and still more preferably 3 or less from a viewpoint of more effectively obtaining an effect by vinylene carbonate.

<Other Component>

The nonaqueous electrolyte solution of the present embodiment may include at least one component other than the above-described components.

Examples of the other component include a known additive that can be included in the nonaqueous electrolyte solution (hereinafter also referred to as a "known additive"), such as sultone (i.e. a cyclic sulfonate ester), an acid anhydride, an oxalato compound, or a cyclic sulfate ester compound.

In a case in which the nonaqueous electrolyte solution of the present embodiment includes the known additive, a content of the known additive with respect to the total amount of the nonaqueous electrolyte solution is preferably from 0.1% by mass to 3% by mass, and more preferably from 0.5% by mass to 3% by mass.

Examples of the sultone include: propane sultone, and propene sultone, and specific examples thereof include: 1,3-propane sultone, 1,4-butane sultone, 1,3-propene sultone, 1-methyl-1,3-propene sultone, 2-methyl-1,3-propene sultone, and 3-methyl-1,3-propene sultone. These may be used singly, or in mixture of plural kinds thereof.

As the sultone, propene sultone is preferable.

Examples of the acid anhydride include:
a carboxylic anhydride such as succinic anhydride, glutaric anhydride, or maleic anhydride;
a disulfonic anhydride such as ethanedisulfonic anhydride, or propanedisulfonic anhydride; and
an anhydride of a carboxylic acid and a sulfonic acid such as sulfobenzoic anhydride, sulfopropionic anhydride, or sulfobutyric anhydride.

These may be used singly, or in mixture of plural kinds thereof.

As the acid anhydride, sulfobenzoic anhydride is preferable.

Examples of the oxalato compound include:
lithium difluorobis(oxalato)phosphate, lithium tetrafluoro(oxalato)phosphate, lithium tris(oxalato)phosphate, lithium difluoro(oxalato)borate, and lithium bis(oxalato)borate.

Examples of the cyclic sulfate ester compound include:
catechol sulfate, 1,2-cyclohexyl sulfate, 2,2-dioxo-1,3,2-dioxathiolane, 4-methyl-2,2-dioxo-1,3,2-dioxathiolane, 4-ethyl-2,2-dioxo-1,3,2-dioxathiolane, 4-propyl-2,2-dioxo-1,3,2-dioxathiolane, 4-butyl-2,2-dioxo-1,3,2-dioxathiolane, 4-pentyl-2,2-dioxo-1,3,2-dioxathiolane, 4-hexyl-2,2-dioxo-1,3,2-dioxathiolane, 4-methylsulfonyloxymethyl-2,2-dioxo-1,3,2-dioxathiolane, 4-ethylsulfonyloxymethyl-2,2-dioxo-1,3,2-dioxathiolane, bis((2,2-dioxo-1,3,2-dioxathiolane-4-yl)methyl)sulfate, and 4,4'-bis(2,2-dioxo-1,3,2-dioxathiolane).

Examples of the other additive also include:
a sulfur-based compound such as ethylene sulfite, propylene sulfite, ethylene sulfate, propylene sulfate, butene sulfate, hexene sulfate, vinylene sulfate, 3-sulfolene, divinyl sulfone, dimethyl sulfate, or diethyl sulfate; a vinylboronic acid compound such as dimethyl vinylboronate, diethyl vinylboronate, dipropyl vinylboronate, or dibutyl vinylboronate;
an amide such as dimethylformamide;
a chain carbamate such as methyl-N,N-dimethylcarbamate;
a cyclic amide such as N-methylpyrrolidone;
a cyclic urea such as N,N-dimethylimidazolidinone;
a borate ester such as trimethyl borate, triethyl borate, tributyl borate, trioctyl borate, or tris(trimethylsilyl) borate;
a phosphoric ester such as lithium difluorophosphate, lithium monofluorophosphate, trimethyl phosphate, triethyl phosphate, tributyl phosphate, trioctyl phosphate, tris(trimethylsilyl) phosphate, or triphenyl phosphate;
an ethylene glycol derivative such as ethylene glycol dimethyl ether, diethylene glycol dimethyl ether, or polyethylene glycol dimethyl ether;
an aromatic hydrocarbon such as biphenyl, fluorobiphenyl, o-terphenyl, toluene, ethylbenzene, fluorobenzene, cyclohexylbenzene, 2-fluoroanisole, or 4-fluoroanisole; and
a carboxylic anhydride having a carbon-carbon unsaturated bond, such as maleic anhydride, or norbornene dicarboxylic anhydride.

An intrinsic viscosity of the nonaqueous electrolyte solution of the present embodiment is preferably 10.0 mPa·s or less at 25° C. from a viewpoint of further improving dissociability of the electrolyte and ionic mobility.

<Method of Manufacturing Nonaqueous Electrolyte Solution>

There is no particular limitation for the method of manufacturing the nonaqueous electrolyte solution of the present embodiment. The nonaqueous electrolyte solution of the present embodiment may be manufactured by mixing respective components.

Examples of the method of manufacturing the nonaqueous electrolyte solution of the present embodiment include a manufacturing method including:
dissolving an electrolyte in a nonaqueous solvent to obtain a solution; and
adding a lithium borate compound (and another additive, if necessary) to the resultant solution and mixing them to obtain a nonaqueous electrolyte solution.

In a manufacturing method according to this one example, an electrical conductivity of the resultant nonaqueous electrolyte solution is preferably reduced with respect to an electrical conductivity of the solution (before the addition of the lithium borate compound). By using the nonaqueous electrolyte solution obtained by the manufacturing method of this aspect, the above-described effect (i.e. an effect of reducing an internal resistance of the battery) of the nonaqueous electrolyte solution is more effectively achieved.

[Lithium Secondary Battery Precursor]

A lithium secondary battery precursor according to an embodiment of the present disclosure (hereinafter, also simply referred to as a "battery precursor of the present embodiment") is a lithium secondary battery precursor that includes:
a case, and
a positive electrode, a negative electrode, a separator, and an electrolyte solution that are housed in the case, wherein
the positive electrode is a positive electrode that is configured to intercalate and de-intercalate lithium ions, and
the negative electrode is a negative electrode that is configured to intercalate and de-intercalate lithium ions, and the electrolyte solution is the nonaqueous electrolyte solution of the present embodiment described above.

Here, the lithium secondary battery precursor means a lithium secondary battery before being charged and discharged.

The lithium secondary battery of the present embodiment described later is manufactured by housing a positive electrode, a negative electrode, a separator, and a nonaqueous electrolyte solution in a case, whereby a lithium secondary battery precursor is manufactured, and by subjecting the resultant lithium secondary battery precursor to charging and discharging (preferably, aging treatment including charging and discharging).

The battery precursor of the present embodiment includes the nonaqueous electrolyte solution of the present embodiment.

Therefore, by using the battery precursor of the present embodiment, an effect similar to the effect by the nonaqueous electrolyte solution of the present embodiment is achieved.

<Case>

The case for the battery precursor of the present embodiment is not particularly limited, and examples thereof include a known case for a lithium secondary battery.

Examples of the case include: a case including a laminate film, and a case including a battery can and a battery can lid.

<Positive Electrode>

The positive electrode in the battery precursor of the present embodiment is a positive electrode that is configured to intercalate and de-intercalate lithium ions.

The positive electrode in the battery precursor of the present embodiment preferably includes at least one positive electrode active material that is configured to intercalate and de-intercalate lithium ions.

The positive electrode in the battery precursor of the present embodiment more preferably includes: a positive electrode current collector; and a positive electrode mixture layer including the positive electrode active material and a binder.

The positive electrode mixture layer is provided on at least a part of a surface of the positive electrode current collector.

(Positive Electrode Active Material)

The positive electrode active material is not particularly limited as long as it is a material that is configured to intercalate and de-intercalate lithium ions, and may be a positive electrode active material usually used for a lithium secondary battery.

Examples of the positive electrode active material include:
an oxide including lithium (Li) and nickel (Ni) as component metal elements; and
an oxide including Li, Ni, and at least one metal element (e.g. a transition metal element, a main group metal element, etc.) other than Li and Ni, as component metal elements.

In the oxide, the metal element other than Li and Ni is preferably included at a percentage equivalent to or less than Ni in terms of the number of atoms.

The metal element other than Li and Ni may be, for example, at least one selected from the group consisting of Co, Mn, Al, Cr, Fe, V, Mg, Ca, Na, Ti, Zr, Nb, Mo, W, Cu, Zn, Ga, In, Sn, La, and Ce. These positive electrode active materials may be used singly, or in mixture of two or more thereof.

The positive electrode active material preferably includes a lithium-containing composite oxide (hereinafter, also referred to as an "NCM") represented by the following Formula (C1).

The lithium-containing composite oxide (C1) has advantages of a high energy density per unit volume and an excellent thermal stability.

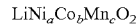          Formula (C1)

wherein, in Formula (C1), each of a, b, and c independently is more than 0 but less than 1, and the sum of a, b, and c is from 0.99 to 1.00.

Specific examples of NCM include $LiNi_{0.33}Co_{0.33}Mn_{0.33}O_2$, $LiNi_{0.5}Co_{0.2}Mn_{0.3}O_2$, $LiNi_{0.6}Co_{0.2}Mn_{0.2}O_2$, and $LiNi_{0.8}Co_{0.1}Mn_{0.1}O_2$.

The positive electrode active material may include a lithium-containing composite oxide (hereinafter, also referred to as an "NCA") represented by the following Formula (C2).

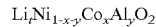          Formula (C2)

wherein, in Formula (C2), t is from 0.95 to 1.15, x is from 0 to 0.3, y is from 0.1 to 0.2, and the sum of x and y is less than 0.5.

Specific examples of NCA include $LiNi_{0.8}Co_{0.15}Al_{0.05}O_2$.

In a case in which the positive electrode in the battery precursor of the present embodiment includes: a positive electrode current collector; and a positive electrode mixture layer including a positive electrode active material and a binder, a content of the positive electrode active material in the positive electrode mixture layer is, for example, 10% by mass or more, preferably 30% by mass or more, still more preferably 50% by mass or more, and particularly preferably 70% by mass or more with respect to the total amount of the positive electrode mixture layer.

A content of the positive electrode active material in the positive electrode mixture layer is, for example, 99.9% by mass or less, preferably 99% by mass or less.

(Binder)

Examples of the binder that can be included in the positive electrode mixture layer include polyvinyl acetate, polymethyl methacrylate, nitrocellulose, a fluororesin, and rubber particle.

Examples of the fluororesin include polytetrafluoroethylene (PTFE), polyvinylidene fluoride (PVDF), a tetrafluoroethylene-hexafluoropropylene copolymer (FEP), and a vinylidene fluoride-hexafluoropropylene copolymer.

Examples of the rubber particles include styrene-butadiene rubber particles and acrylonitrile rubber particles.

Among them, the fluororesin is preferable from a viewpoint of improving an oxidation resistance of the positive electrode mixture layer.

The binder can be used singly, or, in combination of two or more kinds thereof, if necessary.

A content of the binder in the positive electrode mixture layer is preferably from 0.1% by mass to 4% by mass with respect to the positive electrode mixture layer from a viewpoint of a good balance between physical properties (e.g. an electrolyte solution permeability, a peel strength, etc.) of the positive electrode mixture layer and a battery performance.

In a case in which a content of the binder is 0.1% by mass or more, an adhesiveness of the positive electrode mixture layer to the positive electrode current collector and a binding property between the positive electrode active materials are further improved.

In a case in which the content of the binder is 4% by mass or less, the amount of the positive electrode active material in the positive electrode mixture layer can be further increased, and thus a battery capacity is further improved.
(Conductive Auxiliary Material)

In a case in which the positive electrode in the battery precursor of the present embodiment includes a positive electrode current collector and a positive electrode mixture layer, the positive electrode mixture layer preferably includes a conductive auxiliary material.

As the conductive auxiliary material, a known conductive auxiliary material can be used.

As the conductive auxiliary material, a known conductive auxiliary material can be used.

The known conductive auxiliary material is not particularly limited as long as it is a carbon material having conductivity, but graphite, carbon black, conductive carbon fiber (carbon nanotube, carbon nanofiber, carbon fiber), fullerene, and the like can be used singly, or in combination of two or more kinds thereof.

Examples of commercially available carbon blacks include: TOKABLACK #4300, #4400, #4500, #5500 etc. (Furnace black manufactured by TOKAI CARBON CO., LTD.); PRINTEX L etc. (Furnace black manufactured by Degussa AG); RAVEN 7000, 5750, 5250, 5000 ULTRA III, 5000 ULTRA etc., CONDUCTEX SC ULTRA, CONDUCTEX 975 ULTRA etc., PUER BLACK 100, 115, 205 etc. (Furnace black manufactured by Columbian Chemicals Company); #2350, #2400B, #2600B, #30050B, #3030B, #3230B, #3350B, #3400B, #5400B etc. (Furnace black manufactured by Mitsubishi Chemical Corporation); MONARCH 1400, 1300, 900, VULCAN XC-72R, BLACK PEARLS 2000, LITX-50, LITX-200 etc. (Furnace black manufactured by Cabot Corporation); ENSACO 250G, ENSACO 260G, ENSACO 350G, SUPER-P (manufactured by TIMCAL GRAPHITE & CARBON); KETJENBLACK EC-300J, and EC-600JD (manufactured by AKZO N.V.); DENKA BLACK, DENKA BLACK HS-100, and FX-35 (Acetylene black manufactured by Denki Kagaku Kogyo K.K.).

Examples of the graphite include: artificial graphite; and natural graphite (e.g. flake graphite, vein graphite, amorphous graphite, etc.), but are not limited thereto.
(Other Component)

In a case in which the positive electrode in the battery precursor of the present embodiment includes a positive electrode current collector and a positive electrode mixture layer, the positive electrode mixture layer may include another component in addition to each of the above-described components.

Examples of another component include a thickening agent, a surfactant, a dispersant, a wetting agent, and an antifoaming agent.
(Positive Electrode Current Collector)

As the positive electrode current collector, various materials can be used, for example, a metal or an alloy is used.

More specific examples of the positive electrode current collector include: aluminum, nickel, and a stainless steel (referred to as SUS in Japanese Industrial Standards). Among them, aluminum is preferable from a viewpoint of balancing a high electrical conductivity and a cost. Here, a term of "aluminum" means pure aluminum or an aluminum alloy.

A particular preferable positive electrode current collector is an aluminum foil.

The aluminum foil is not particularly limited, and examples thereof include: a material of A1085, and a material of A3003 as defined in Japanese Industrial standards.

(Method of Forming Positive Electrode Mixture Layer)

The positive electrode mixture layer can be formed, for example, by applying a positive electrode mixture slurry including a positive electrode active material and a binder to a surface of a positive electrode current collector and then drying the slurry.

As a solvent included in the positive electrode mixture slurry, an organic solvent such as N-methyl-2-pyrrolidone (NMP) is preferable.

There are no particular limitation for the application method and the drying method in applying the positive electrode mixture slurry on the positive electrode current collector and drying the slurry.

Examples of the application method include: slot-die coating, slide coating, curtain coating, and gravure coating.

Examples of the drying method include: drying with warm air, hot air, or low-humidity air; vacuum drying; and drying by infrared (e.g. far-infrared) irradiation.

A drying time and a drying temperature are not particularly limited, and the drying time is from 1 minute to 30 minutes, for example, and the drying temperature is from 40° C. to 80° C., for example.

A method of manufacturing the positive electrode mixture layer preferably has a step of reducing a porosity of the positive electrode active material layer by pressurization treatment using a die press, a roll press, or the like, after the positive electrode mixture slurry has been applied onto the positive electrode current collector and the slurry has been dried.
<Negative Electrode>

The negative electrode in the battery precursor of the present embodiment is a negative electrode that is configured to intercalate and de-intercalate lithium ions.

The negative electrode in the battery precursor of the present embodiment preferably includes at least one negative electrode active material that is configured to intercalate and de-intercalate lithium ions.

The negative electrode in the battery precursor of the present embodiment more preferably includes: a negative electrode current collector; and a negative electrode mixture layer including a negative electrode active material and a binder.

The negative electrode mixture layer is provided on at least a part of a surface of the negative electrode current collector.
(Negative Electrode Active Material)

The negative electrode active material is not particularly limited as long as it is a material that is configured to intercalate and de-intercalate lithium ions, and, for example, at least one selected from the group consisting of metal lithium, a lithium-containing alloy, a metal or an alloy capable of being alloyed with lithium, an oxide capable of being doped/dedoped with lithium ions, a transition metal nitride capable of being doped/dedoped with lithium ions, and a carbon material capable of being doped/dedoped with lithium ions can be used (singly, or a mixture including two or more kinds thereof can be used).

Among them, a carbon material capable of being doped/dedoped with lithium ions is preferable.

Examples of the carbon material include: carbon black, activated carbon, a graphite material (e.g. artificial graphite, natural graphite, etc.), and an amorphous carbon material.

A form of the carbon material may be any of a fibrous form, a spherical form, a potato form, or a flake form.

A particle size of the carbon material is not particularly limited, and is, for example, from 5 μm to 50 μm, preferably from 20 μm to 30 μm.

Specific examples of the amorphous carbon material include: hard carbon, coke, mesocarbon microbeads (MCMB) calcined at 1500° C. or lower, and mesophase pitch carbon fiber (MCF).

Examples of the graphite material include: natural graphite, and artificial graphite.

As the artificial graphite, graphitized MCMB, graphitized MCF, or the like is used.

As the graphite material, a graphite material that includes boron, or the like can also be used.

As the graphite material, a graphite material that is coated with a metal such as gold, platinum, silver, copper, or tin, a graphite material that is coated with amorphous carbon, or a mixture of amorphous carbon and graphite can also be used.

These carbon materials may be used singly, or in combination of two or more kinds thereof.

(Conductive Auxiliary Material)

In a case in which the negative electrode in the battery precursor of the present embodiment includes a negative electrode current collector and a negative electrode mixture layer, the negative electrode mixture layer preferably includes a conductive auxiliary material.

As the conductive auxiliary material, a known conductive auxiliary material can be used.

Specific examples of the conductive auxiliary material that can be included in the negative electrode mixture layer are similar to the specific examples of the conductive auxiliary material that can be included in the positive electrode mixture layer described above.

(Other Component)

In a case in which the negative electrode in the battery precursor of the present embodiment includes the negative electrode current collector and the negative electrode mixture layer, the negative electrode mixture layer may include another component in addition to each of the above-described components.

Examples of another component include a thickening agent, a surfactant, a dispersant, a wetting agent, and an antifoaming agent.

(Method of Forming Negative Electrode Mixture Layer)

The negative electrode mixture layer can be formed, for example, by applying a negative electrode mixture slurry including a negative electrode active material and a binder to a surface of the negative electrode current collector and drying the slurry.

As a solvent included in the negative electrode mixture slurry, water is preferably used, but, if necessary, a liquid medium miscible with water may be used, for example, in order to improve an applicability to the current collector.

Examples of the liquid medium miscible with water include: an alcohol, a glycol, a cellosolve, an amino alcohol, an amine, a ketone, a carboxylic acid amide, a phosphoric acid amide, a sulfoxide, a carboxylate ester, a phosphoric ester, an ether, and a nitrile. The liquid medium may be used in a range of miscibility with water.

A preferable aspect of the method of forming the negative electrode mixture layer is similar to the preferable aspect of the method of forming the positive electrode mixture layer described above.

<Separator>

Examples of the separator in the battery precursor of the present embodiment include: a porous flat plate including a resin such as polyethylene (PE), polypropylene (PP), polyester, cellulose, or polyamide. Examples of the separator also include a non-woven fabric including the above-described resin.

Preferred examples include a porous resin sheet having a single layer or multilayer structure mainly including one kind of or two or more kinds of polyolefin resins.

A thickness of the separator can be, for example, from 5 μm to 30 μm.

The separator is preferably disposed between the positive electrode and the negative electrode.

<Electrolyte Solution>

The electrolyte solution in the battery precursor of the present embodiment is the nonaqueous electrolyte solution of the present embodiment described above.

The preferred aspect of the nonaqueous electrolyte solution of the present embodiment is as described above.

<Method of Manufacturing Battery Precursor>

There is no particular limitation for the method of manufacturing the battery precursor of the present embodiment.

One example of the method of manufacturing the battery precursor of the present embodiment includes a step of housing a positive electrode, a negative electrode, a separator, and electrolyte solution into a case.

The one example described above preferably includes:
housing a positive electrode, a negative electrode, and a separator, into a case; and
injecting an electrolyte solution into the case in which the positive electrode, the negative electrode, and the separator have been housed.

<Configuration of Battery>

The lithium secondary battery according to the present disclosure can be in various known shapes, and can be formed into a cylindrical shape, a coin shape, a square shape, a laminated shape, a film shape, or any other shape. However, a basic structure of the battery is identical regardless of the shape, and a design change can be made according to an intended purpose.

Examples of the lithium secondary battery according to the present disclosure include a laminated-type battery.

Figure 2:
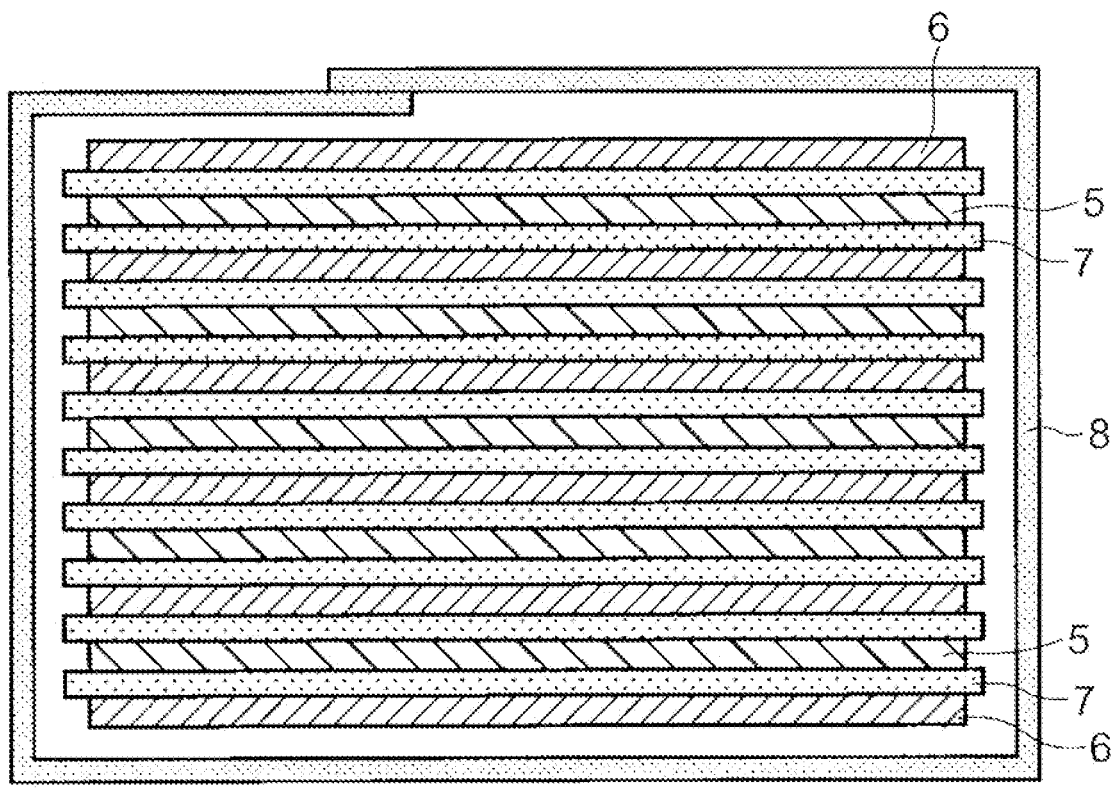
FIG. 2 is a schematic cross-sectional view in a thickness direction of a laminated-type electrode body to be housed in the laminated-type battery shown in FIG. 1.

FIG. 1 is a schematic perspective view showing one example of a laminated-type battery, which is one example of a lithium secondary battery according to the present disclosure. FIG. 2 is a schematic cross-sectional view in a thickness direction of a laminated-type electrode body to be housed in the laminated-type battery shown in FIG. 1.

The laminated-type battery shown in FIG. 1 includes a laminated exterior body 1 in which a nonaqueous electrolyte solution (not shown in FIG. 1) and a laminated-type electrode body (not shown in FIG. 1) are housed, and whose inside is sealed by sealing peripheral edge portions thereof. As the laminated exterior body 1, a laminated exterior body made of aluminum is used, for example.

As shown in FIG. 2, the laminated-type electrode body to be housed in the laminated exterior body 1 includes: a laminated body in which a positive electrode plate 5 and a negative electrode plate 6 are disposed one on another in layers with a separator 7 interposed therebetween; and a separator 8 that surrounds a periphery of the laminated body. The positive electrode plate 5, the negative electrode plate 6, the separator 7, and the separator 8 are impregnated with the nonaqueous electrolyte solution of the present disclosure.

Each of plural positive electrode plates 5 in the laminated-type electrode body is electrically connected to a positive electrode terminal 2 via a positive electrode tab (not shown), and a part of the positive electrode terminal 2 protrudes outward from a peripheral end portion of the laminated exterior body 1 (FIG. 1). A portion where the positive electrode terminal 2 protrudes at the peripheral end portion of the laminated exterior body 1 is sealed by an insulating seal 4.

Similarly, each of plural negative electrode plates 6 in the laminated-type electrode body is electrically connected to a negative electrode terminal 3 via a negative electrode tab (not shown), and a part of the negative electrode terminal 3 protrudes outward from the peripheral end portion of the laminated exterior body 1 (FIG. 1). A portion where the negative electrode terminal 3 protrudes at the peripheral end portion of the laminated exterior body 1 is sealed by an insulating seal 4.

In the laminated-type battery according to the one example described above, the number of the positive electrode plates 5 is five, the number of the negative electrode plates 6 is six, and the positive electrode plates 5 and the negative electrode plates 6 are disposed in layers with the separators 7 interposed therebetween in such an arrangement that each of the outermost layers on opposite sides is a negative electrode plate 6. However, the number of positive electrode plates, the number of negative electrode plates, and an arrangement in the laminated-type battery are not limited to this one example, and it is needless to say that various changes can be made.

Another one example of the lithium secondary battery according to the present disclosure includes a coin-type battery.

Figure 3:
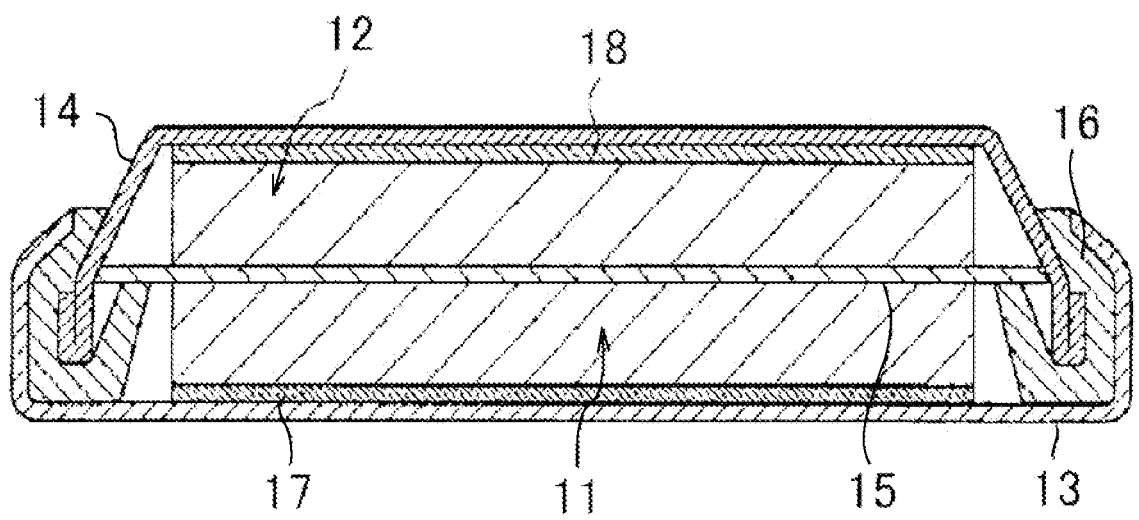
FIG. 3 is a schematic cross-sectional view showing one example of a coin-type battery, which is another one example of the lithium secondary battery according to the present disclosure.

FIG. 3 is a schematic perspective view showing one example of a coin-type battery, which is another one example of the lithium secondary battery according to the present disclosure.

In the coin-type battery shown in FIG. 3, a disk-shaped negative electrode 12, a separator 15 into which a nonaqueous electrolyte solution is injected, a disk-shaped positive electrode 11, and if necessary, spacer plates 17 and 18 made of stainless steel, aluminum, or the like are housed between a positive electrode can 13 (hereinafter, also referred to as a "battery can") and a sealing plate 14 (hereinafter, also referred to as a "battery can lid") in a state of being layered in this order. The positive electrode can 13 and the sealing plate 14 are caulked and sealed with a gasket 16 interposed therebetween.

In this one example, the nonaqueous electrolyte solution of the present disclosure is used as a nonaqueous electrolyte solution to be injected into the separator 15.

The lithium secondary battery according to the present disclosure may be a lithium secondary battery obtained by charging and discharging a lithium secondary battery (lithium secondary battery before charging and discharging) including a negative electrode, a positive electrode, and the nonaqueous electrolyte solution of the present disclosure.

That is, the lithium secondary battery according to the present disclosure may be a lithium secondary battery (charged and discharged lithium secondary battery) prepared by first preparing a lithium secondary battery before charging and discharging that includes a negative electrode, a positive electrode, and the nonaqueous electrolyte solution of the present disclosure, and then charging and discharging one or more times the lithium secondary battery that is prior to charging and discharging.

[Method of Manufacturing Lithium Secondary Battery]

A method of manufacturing a lithium secondary battery according to an embodiment of the present disclosure (hereinafter, also referred to as a "method of manufacturing a battery of the present embodiment") is a method of manufacturing a lithium secondary battery including:

preparing a battery precursor of the present embodiment (hereinafter, also referred to as a "preparation step"); and subjecting the battery precursor to an aging treatment to obtain a lithium secondary battery (hereinafter, also referred to as an "aging step"), and wherein the aging treatment includes charging and discharging the battery precursor in an environment of from 20° C. to 60° C.

The aging treatment in the aging step preferably includes:

an initial holding phase of holding a battery precursor in an environment of from 20° C. to 60° C.;

an initial charging phase in which the battery precursor after the initial holding phase is charged in an environment of from 20° C. to 60° C.;

a second holding phase of holding the battery precursor after the initial charging phase in an environment of from 20° C. to 60° C.; and a charge-discharge phase in which the battery precursor after the second holding phase is subjected to a combination of charging and discharging one or more times in an environment of from 20° C. to 60° C.

According to the preferred embodiment described above, a reduction of battery resistances of the lithium secondary battery after storage and after cycles is effectively achieved.

A preferred aspect of the nonaqueous electrolyte solution in the lithium secondary battery according to the present embodiment is similar to the preferred aspect of the nonaqueous electrolyte solution of the present embodiment except that the nonaqueous electrolyte solution is not limited to the nonaqueous electrolyte solution that includes the lithium borate compound of the present disclosure.

The nonaqueous electrolyte solution in the battery according to the present embodiment may include the lithium borate compound.

For example, in a case in which the battery according to the present embodiment is manufactured by the method of manufacturing a battery of the present embodiment, the lithium borate compound may be completely consumed, or some of the lithium borate compound may remain, by the aging treatment.

The additive for a lithium secondary battery of the present disclosure, the nonaqueous electrolyte solution for a lithium secondary battery of the present disclosure, the lithium secondary battery precursor of the present disclosure, the method of manufacturing a lithium secondary battery of the present disclosure, and the lithium secondary battery of the present disclosure, which are described above, are applicable to, for example, an electronic device such as a mobile phone or a notebook personal computer; an electric vehicle; a hybrid vehicle; a power source for power storage; and the like.

The additive for a lithium secondary battery of the present disclosure, the nonaqueous electrolyte solution for a lithium secondary battery of the present disclosure, the lithium secondary battery precursor of the present disclosure, the method of manufacturing a lithium secondary battery of the present disclosure, and the lithium secondary battery of the disclosure are particularly suitably used for a hybrid vehicle or an electric vehicle.

EXAMPLES

Hereinafter, examples of the present disclosure will be described, but the present disclosure is not limited to the following examples.

[Example 1] Synthesis Example of Lithium Borate Compound Represented by Formula (II)

(1) First Reaction Step

A 100 mL flask equipped with a stirrer, a thermometer, a gas introduction line, an exhaust line, and a dropping tube was prepared. After the 100 mL flask was purged with dry nitrogen gas, 2.91 g (0.05 mol) of potassium fluoride, 5.20 g (0.05 mol) of trimethyl borate, and 50 g of tetrahydrofuran were added, and the mixture was stirred and mixed to give a slurry. While stirring the slurry, 7.11 g (0.05 mol) of (trifluoromethyl)trimethylsilane was added dropwise from the dropping tube, and the stirring was continued at room temperature (25° C.) for 24 hours. The reaction solution after the reaction described above changed from the slurry prior to the start of the reaction to a homogeneous solution. This solution was filtered to remove dust, and the resultant filtrate was dried under a condition of 60° C. and 10 kPa or below to give 9.86 g of a solid product.

A part of the resultant solid was dissolved in a deuterated water solvent, and subjected to $^1$H-NMR analysis, $^{11}$B-NMR analysis, and $^{19}$F-NMR analysis at room temperature (25° C.). The chemical shifts [ppm] of the spectra obtained by each of the NMR analyses were as follows.

$^1$H-NMR: 3.2 ppm (s)
$^{11}$B-NMR: −2.2 ppm (m)
$^{19}$F-NMR: −74.7 ppm (m)

The resultant product was confirmed from the above-described NMR spectrum patterns to be potassium trimethoxy(trifluoromethyl)borate, which is a reaction intermediate shown in the following reaction scheme.

(2) Second Reaction Step

Together with 50 g of methanol, 8.48 g (0.04 mol) of the reaction intermediate was added into the original reaction flask, then 1.70 g (0.04 mol) of lithium chloride was added thereto, and the mixture was stirred and mixed to give a homogeneous solution. Thereafter, this solution was heated to 65° C. and stirred in a solvent reflux condition for 1 hour. The reaction solution obtained by this step changed from the homogeneous solution to a slurry in which a solid salt was precipitated. The slurry was filtered to remove the solid, and the filtrate was dried under a condition of 60° C. and 10 kPa or below to give 6.51 g of a white crystalline solid product.

A part of the resultant solid was dissolved in a deuterated water solvent, and subjected to $^1$H-NMR analysis, $^7$Li-NMR analysis, $^{11}$B-NMR analysis, and $^{19}$F-NMR analysis at room temperature (25° C.). The chemical shifts [ppm] of the spectra obtained by each of the NMR analyses were as follows.

$^1$H-NMR: 3.2 ppm (s)
$^7$Li-NMR: 2.9 ppm (s)
$^{11}$B-NMR: −2.0 ppm (m)
$^{19}$F-NMR: −74.7 ppm (m)

As described above, the product obtained by the synthesis of Example 1 was confirmed to be a lithium borate compound of the present disclosure shown by the following reaction scheme, that is, a lithium borate compound represented by Formula (II) (hereinafter, also referred to as a "lithium borate compound (II)").

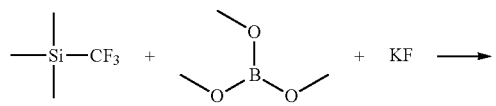

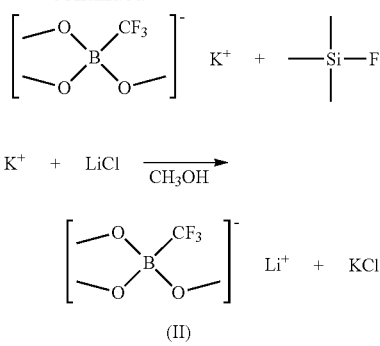

(II)

[Example 2] Synthesis Example of Lithium Borate Compound Represented by Formula (III)

The synthesis was conducted in the same manner as in Example 1, except that the second reaction step in Example 1 was changed to the method shown below.

Together with 60 g of ethanol, 8.48 g (0.04 mol) of the reaction intermediate was added into the original reaction flask, and then 1.70 g (0.04 mol) of lithium chloride was added thereto and stirred and mixed to give a homogeneous solution. Thereafter, the solution was heated to 80° C. and stirred in a solvent reflux condition for 1 hour. The reaction solution obtained by this step changed from the homogeneous solution to a slurry in which a solid salt was precipitated. The slurry was filtered to remove the solid, and the filtrate was dried under a condition of 60° C. and 10 kPa or below to give 6.83 g of a white crystalline solid product.

A part of the resultant solid was dissolved in a deuterated water solvent, and subjected to $^1$H-NMR analysis, $^7$Li-NMR analysis, $^{11}$B-NMR analysis, and $^{19}$F-NMR analysis at room temperature (25° C.). The chemical shifts [ppm] of the spectra obtained by each of the NMR analyses were as follows.

$^1$H-NMR: 1.0 ppm (t), 3.4 ppm (q)
$^7$Li-NMR: 2.9 ppm (s)
$^{11}$B-NMR: −2.2 ppm (m)
$^{19}$F-NMR: −74.7 ppm (m)

As described above, the product obtained by the synthesis of Example 2 was confirmed to be a lithium borate compound of the present disclosure shown by the following reaction scheme, that is, a lithium borate compound (hereinafter, also referred to as a "lithium borate compound (III)") represented by Formula (III).

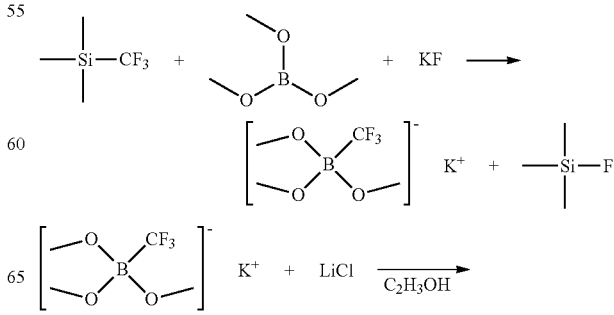

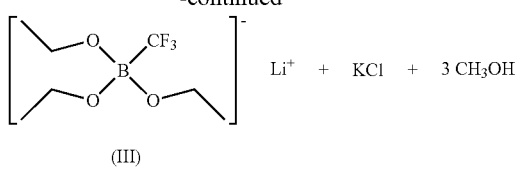

(III)

[Example 3] Synthesis Example of Lithium Borate Compound Represented by Formula (IV)

The synthesis was conducted in the same manner as in Example 1, except that the second reaction step in Example 1 was changed to the method shown below.

Together with 80 g of isopropanol, 8.48 g (0.04 mol) of the reaction intermediate was added into the original reaction flask, and then 1.70 g (0.04 mol) of lithium chloride was added thereto and stirred and mixed to obtain a homogeneous solution. Thereafter, the solution was heated to 85° C. and stirred for 1 hour in a solvent reflux condition. The reaction solution obtained by this step changed from the homogeneous solution to a slurry in which a solid salt was precipitated. The slurry was filtered to remove the solid, and the filtrate was dried under a condition of 60° C. and 10 kPa or below to give 7.04 g of a white crystalline solid product.

A part of the resultant solid was dissolved in a deuterated water solvent, and subjected to $^1$H-NMR analysis, $^7$Li-NMR analysis, $^{11}$B-NMR analysis, and $^{19}$F-NMR analysis at room temperature (25° C.). The chemical shifts [ppm] of the spectra obtained by each of the NMR analyses were as follows.

$^1$H-NMR: 1.0 ppm (d), 3.8 ppm (m)
$^7$Li-NMR: 2.9 ppm (s)
$^{11}$B-NMR: −2.0 ppm (m)
$^{19}$F-NMR: −74.7 ppm (m)

As described above, the product obtained by the synthesis of Example 3 was confirmed to be a lithium borate compound of the present disclosure shown by the following reaction scheme, that is, a lithium borate compound represented by Formula (IV) (hereinafter, also referred to as a "lithium borate compound (IV)").

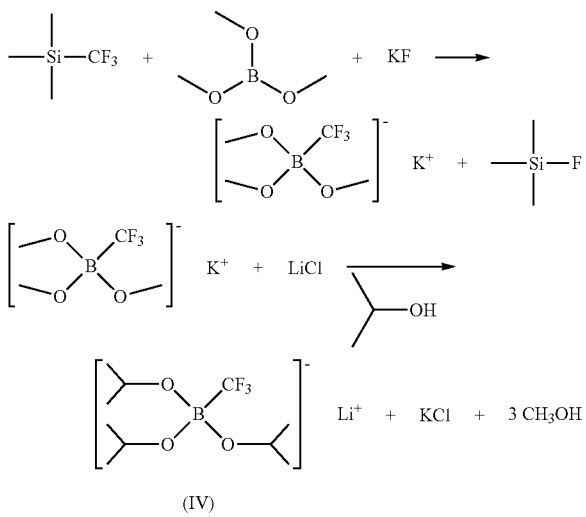

(IV)

[Example 4] Synthesis Example of Lithium Borate Compound Represented by Formula (V)

The synthesis was conducted in the same manner as in Example 1, except that the second reaction step in Example 1 was changed to the synthesis method shown below.

Together with 80 g of n-butanol, 6.36 g (0.03 mol) of the reaction intermediate was added into the original reaction flask, and then 1.23 g (0.03 mol) of lithium chloride was added thereto and stirred and mixed to give a homogeneous solution. Thereafter, the solution was heated to 85° C. and stirred at this temperature for 1 hour. The reaction solution obtained by this step changed from the homogeneous solution to a slurry in which a solid salt was precipitated. The slurry was filtered to remove the solid, and the filtrate was dried under a condition of 80° C. and 10 kPa or below to give 8.36 g of a white crystalline solid product.

A part of the resultant solid was dissolved in a deuterated water solvent, and subjected to $^1$H-NMR analysis, $^7$Li-NMR analysis, $^{11}$B-NMR analysis, and $^{19}$F-NMR analysis at room temperature (25° C.). The chemical shifts [ppm] of the spectra obtained by each of the NMR analyses were as follows.

$^1$H-NMR: 0.7 ppm (t), 1.2 ppm (m), 1.4 ppm (m), 3.4 ppm (t)
$^7$Li-NMR: 2.9 ppm (s)
$^{11}$B-NMR: −2.0 ppm (m)
$^{19}$F-NMR: −74.7 ppm (m)

As described above, the product obtained by the synthesis of Example 4 was confirmed to be a lithium borate compound of the present disclosure shown by the following reaction scheme, that is, a lithium borate compound represented by Formula (V) (hereinafter, also referred to as a "lithium borate compound (V)").

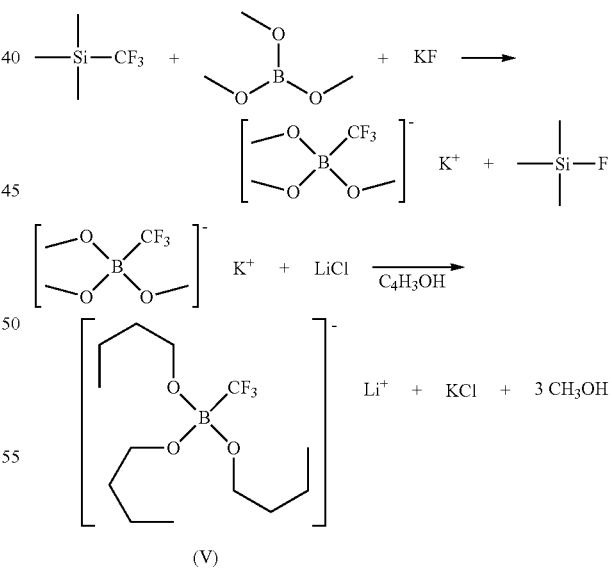

(V)

Example 101

A coin-type lithium secondary battery (hereinafter, also referred to as a "coin-type battery") having a configuration shown in FIG. 3 was fabricated by the following procedure.

<Fabrication of Negative Electrode>

Amorphous coated natural graphite (97 parts by mass), carboxymethyl cellulose (1 part by mass) and SBR latex (2 parts by mass) were kneaded with an aqueous solvent to prepare a paste-like negative electrode mixture slurry.

Next, the negative electrode mixture slurry was applied to a negative electrode current collector made of a strip-shaped copper foil having a thickness of 10 μm, and the slurry was dried, then the applied negative electrode current collector was compressed by a roll press to give a sheet-shaped negative electrode that includes the negative electrode current collector and a negative electrode active material layer. A coating density and a packing density of the negative electrode active material layer at this time were 10 mg/cm$^2$ and 1.5 g/ml, respectively.

<Fabrication of Positive Electrode>

$LiNi_{0.5}Mn_{0.3}Co_{0.2}O_2$ (90 parts by mass), acetylene black (5 parts by mass) and polyvinylidene fluoride (5 parts by mass) were kneaded with N-methylpyrrolidinone as a solvent to prepare a paste-like positive electrode mixture slurry.

Next, the positive electrode mixture slurry was applied to a positive electrode current collector of a strip-shaped aluminum foil having a thickness of 20 μm, and the slurry was dried, then the applied positive electrode current collector was compressed by a roll press to give a sheet-like positive electrode that includes the positive electrode current collector and a positive electrode active material layer. A coating density and a packing density of the positive electrode active material layer at this time were 16 mg/cm$^2$ and 2.5 g/ml, respectively.

<Preparation of Nonaqueous Electrolyte Solution>

As a nonaqueous solvent, ethylene carbonate (EC), dimethyl carbonate (DMC), and methylethyl carbonate (EMC) were mixed at a ratio of 30:35:35 (volume ratio), respectively, to give a mixed solvent.

In the resultant mixed solvent, $LiPF_6$ as an electrolyte was dissolved so that an electrolyte concentration became 1.2 mol/liter in a finally prepared nonaqueous electrolyte solution.

To the resultant solution, the lithium borate compound (II) was added by an addition amount shown in Table 1 and dissolved, thereby obtaining a nonaqueous electrolyte solution.

<Fabrication of Coin-Type Battery>

The negative electrode described above was punched into a disk shape having a diameter of 14 mm, and the positive electrode described above was punched into a disk shape having a diameter of 13 mm to give a coin-shaped negative electrode and a coin-shaped positive electrode, respectively. A microporous polyethylene film having a thickness of 20 μm was punched into a disk shape having a diameter of 17 mm to give a separator.

The obtained coin-shaped negative electrode, separator, and coin-shaped positive electrode were layered in this order in a stainless steel battery can (a size of 2032 type), and then 20 μL of the above-described nonaqueous electrolyte solution was injected into the battery can so as to be impregnated into the separator, the positive electrode, and the negative electrode.

Next, an aluminum plate (thickness: 1.2 mm, diameter: 16 mm) and a spring were placed on the positive electrode, and the battery was sealed by caulking a battery can lid with a polypropylene gasket interposed therebetween.

As described above, a coin-type battery (i.e. a coin-type lithium secondary battery) that had a configuration shown in FIG. 3 having a diameter of 20 mm and a height of 3.2 mm was obtained.

Examples 102 to 104, Comparative Example 101

A lithium secondary battery was fabricated in the same manner as in Example 101 except that a type of an additive included in the nonaqueous electrolyte solution was changed as shown in Table 1, and the following evaluation was made in the same manner as in Example 101. The results are shown in Table 1.

The following evaluation was made for the resultant coin-type battery.

The evaluation results are shown in Table 1.

<Evaluation of Direct Current Resistance of Battery after Storage>

An evaluation of a direct current resistance was made for each of batteries of Examples 101 to 104 and Comparative Example 101 as an evaluation of an internal resistance of the battery.

Details are shown below.

(Initial Resistance (25° C.))

A coin-type battery was three times repeatedly charged and discharged at a constant voltage of 4.2 V, and then charged up to a constant voltage of 3.6 V. Next, the charged coin-type battery was cooled to 25° C. in a thermostatic chamber, and discharged at a constant current of 0.2 mA at 25° C., and then a decrease in potential was measured during 10 seconds from the start of discharge so that a direct current resistance [Ω] of the coin-type battery was determined. The obtained value was defined as an initial resistance [Ω] (25° C.). An initial resistance [Ω] (25° C.) of a coin-type battery of Comparative Example 101 described later was determined in the same manner.

From these results, based on the following Formula, an "initial resistance (25° C.) (relative value; %)" is determined as an initial resistance (relative value; %) in Example 101 in a case in which an initial resistance [Ω] (25° C.) in Comparative Example 101 was defined as 100%. The results are shown in Table 1.

Initial resistance (25° C.) (relative value; %)=(Initial resistance [Ω] (25° C.) in Example 101/Initial resistance [Ω] (25° C.) in Comparative Example 101)×100

(Resistance after 6 Days of Storage)

The coin-type battery was three times repeatedly charged and discharged at a constant voltage of 4.2 V, then charged up to 4.2 V, and was stored at 60° C. for 6 days. The direct current resistance of the battery after storage for 6 days was determined by the same method as the method for the initial resistance described above, and the obtained value of the direct current resistance was defined as a direct current resistance for the battery after 6 days of storage.

Respective relative values for the values of the direct current resistance for the battery after 6 days of storage were determined in a case in which the initial value for the direct current resistance of the battery in Comparative Example 101 was defined as 100.

In Table 1, the initial direct current resistance in Comparative Example 101 was shown as 100, and the relative values described above (i.e. the relative values in a case in which the initial direct current resistance in Comparative Example 101 was defined as 100) of the direct current resistances after 6 days of storage were shown.

TABLE 1

| | Additive for Nonaqueous Electrolyte Solution (wt %) | Direct Current Resistance of Battery (Relative Value) | |
|---|---|---|---|
| | | Initial Resistance | Resistance after 6 Days of Storage |
| Comparative Example 101 | Not included | 100 | 239 |
| Example 101 | Lithium Borate Compound (II) (0.5) | 99 | 235 |
| Example 102 | Lithium Borate Compound (III) (0.5) | 103 | 207 |
| Example 103 | Lithium Borate Compound (IV) (0.5) | 93 | 207 |
| Example 104 | Lithium Borate Compound (V) (0.5) | 98 | 223 |

Table 1 shows that, the battery resistances after storage in Examples, in which the lithium borate compound of the present disclosure was included in the nonaqueous solvent, were reduced as compared with the battery resistance after storage in Comparative Example.

Examples 111 to 114

A lithium secondary battery was fabricated in the same manner as in Example 101 except that a type and a content of an additive included in the nonaqueous electrolyte solution were changed as shown in Table 2.

The following evaluation was made for the resultant coin-type batteries shown in Table 2.

The evaluation results are shown in Table 2.

<Evaluation of Direct Current Resistance of Battery after Cycle>

For each battery obtained in each example, the direct current resistance was evaluated as an evaluation of an internal resistance of the battery after the cycle. Details are shown below.

The following operation was conducted at a temperature condition of 55° C.

A battery was charged up to SOC 80% at a charge rate of 0.2 C, and then discharged to SOC 20% at a discharge rate of 1 C, and this cycle was conducted for 0 cycle, 100 cycles, and 200 cycles.

A direct current resistance (Ω) of a battery obtained after each cycle was measured by the following method. The relative value was determined in a case in which a value of direct current resistance after 0 cycle (i.e. at an initial stage) of the battery in Comparative Example 101 was defined as 100. The results are shown in Table 2.

(Initial Resistance (−20° C.))

The coin-type battery was three times repeatedly charged and discharged at a constant voltage of 4.2 V, and then charged up to a constant voltage of 3.6 V. Next, the charged coin-type battery was cooled to −20° C. in a thermostatic chamber, and discharged at a constant current of 0.2 mA at −20° C., and then a decrease in potential during 10 seconds from the start of discharge was measured so that the direct current resistance [Ω] of the coin-type battery was determined, and the obtained value was defined as a resistance after 0 cycle (also referred to as an "initial resistance [Ω] (−20° C.)"). The initial resistance [Ω] (−20° C.) was measured in the same manner for a coin-type battery of Comparative Example 101 described later.

From these results, based on the following Formula, the "initial resistance (−20° C.) (relative value; %) was determined as an initial resistance (relative value; %) in Example 101 in a case in which the initial resistance [Ω] (−20° C.) of Comparative Example 101 was defined as 100%. The results are shown in Table 2.

Initial resistance (−20° C.) (relative value; %)=(Initial resistance [Ω] (−20° C.) in Example 101/Initial resistance [Ω] (−20° C.) in Comparative Example 101)×100

TABLE 2

| | Additive for Nonaqueous Electrolyte Solution (wt %) | Direct Current Resistance of Battery (Relative Value) | | |
|---|---|---|---|---|
| | | After 0 Cycle | After 100 Cycles | After 200 Cycles |
| Comparative Example 101 | Not included | 100 | 103 | 102 |
| Example 101 | Lithium Borate Compound (II) (0.5) | 96 | 90 | 90 |
| Example 111 | Lithium Borate Compound (II) (1.0) | 83 | 85 | 85 |
| Example 102 | Lithium Borate Compound (III) (0.5) | 91 | 88 | 89 |
| Example 112 | Lithium Borate Compound (III) (1.0) | 86 | 86 | 84 |
| Example 103 | Lithium Borate Compound (IV) (0.5) | 89 | 90 | 87 |
| Example 113 | Lithium Borate Compound (IV) (1.0) | 93 | 89 | 86 |
| Example 104 | Lithium Borate Compound (V) (0.5) | 87 | 87 | 84 |
| Example 114 | Lithium Borate Compound (V) (1.0) | 87 | 84 | 84 |

Table 2 shows that the battery resistances after cycles in Examples, in which the lithium borate compound of the present disclosure was included in the nonaqueous solvent, were reduced as compared with those in Comparative Example.

Examples 121 to 124, Comparative Example 121

A lithium secondary battery was fabricated in the same manner as in Example 101 except that a nonaqueous electrolyte solution was prepared with a type and a content of the lithium borate compound included in the nonaqueous electrolyte solution as shown in Table 3, and also with a content of vinylene carbonate included in the nonaqueous electrolyte solution as shown in Table 3.

An evaluation of battery resistances after cycles was made for the obtained coin-type batteries shown in Table 3 by the same method as the method of measuring the direct current resistance (Ω) of the battery obtained after each cycle described above. The results are shown in Table 3.

TABLE 3

| | Additive for Nonaqueous Electrolyte Solution | | Content Ratio by Mass | Direct Current Resistance of Battery (Relative Value) | | |
|---|---|---|---|---|---|---|
| | Vinylene Carbonate (wt %) | Lithium Borate Compound (wt %) | [VC/Lithium Borate Compound] | After 0 Cycle | After 100 Cycles | After 200 Cycles |
| Comparative Example 101 | Not included | Not included | — | 100 | 105 | 110 |
| Comparative Example 121 | Vinylene Carbonate (0.5) | Not included | 0 | 124 | 113 | 110 |
| Example 121 | Vinylene Carbonate (0.5) | Lithium Borate Compound (II) (0.5) | 1.0 | 111 | 98 | 89 |
| Example 122 | Vinylene Carbonate (0.5) | Lithium Borate Compound (III) (0.5) | 1.0 | 101 | 93 | 84 |
| Example 123 | Vinylene Carbonate (0.5) | Lithium Borate Compound (IV) (0.5) | 1.0 | 110 | 95 | 85 |
| Example 124 | Vinylene Carbonate (0.5) | Lithium Borate Compound (V) (0.5) | 1.0 | 102 | 92 | 84 |

Table 3 shows that the battery resistances after cycles in Examples, in which vinylene carbonate and the lithium borate compound of the present disclosure were included in the nonaqueous solvent, were reduced as compared with those in Comparative Examples.

The disclosure of Japanese Patent Application No. 2019-046971, filed on Mar. 14, 2019, is incorporated herein by reference in its entirety.

All documents, patent applications, and technical standards described in this specification are incorporated herein by reference to the same extent as if each document, patent application, and technical standard were specifically and individually indicated to be incorporated by reference.

The invention claimed is:

1. An additive for a lithium secondary battery, the additive comprising a lithium borate compound represented by the following Formula (I):

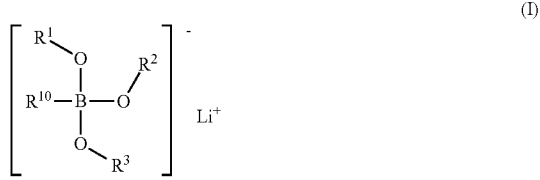

wherein, in Formula (I), each of $R^1$, $R^2$, and $R^3$ independently represents an unsubstituted hydrocarbon group having from 1 to 20 carbon atoms, and $R^{10}$ represents a fluorine atom, or a fluorinated hydrocarbon group.

2. A nonaqueous electrolyte solution for a lithium secondary battery, the solution comprising:
an electrolyte that is a lithium salt comprising fluorine;
a nonaqueous solvent; and
the additive for a lithium secondary battery according to claim 1.

3. The nonaqueous electrolyte solution for a lithium secondary battery according to claim 2, wherein a content of the lithium borate compound is from 0.1% by mass to 5.0% by mass with respect to a total amount of the nonaqueous electrolyte solution for a lithium secondary battery.

4. The nonaqueous electrolyte solution for a lithium secondary battery according to claim 2, further comprising a cyclic carbonate ester having an unsaturated bond.

5. The nonaqueous electrolyte solution for a lithium secondary battery according to claim 4, wherein the cyclic carbonate ester having an unsaturated bond is vinylene carbonate.

6. The nonaqueous electrolyte solution for a lithium secondary battery according to claim 5, wherein a ratio of a content by mass of the vinylene carbonate to a content by mass of the lithium borate compound is in a range of from 0.1 to 10.

7. A lithium secondary battery precursor, comprising:
a case; and
a positive electrode, a negative electrode, a separator, and an electrolyte solution that are housed in the case, wherein:
the positive electrode is a positive electrode that is configured to intercalate and de-intercalate lithium ions,
the negative electrode is a negative electrode that is configured to intercalate and de-intercalate lithium ions, and
the electrolyte solution is the nonaqueous electrolyte solution for a lithium secondary battery according to claim 2.

8. A method of manufacturing a lithium secondary battery, the method comprising:
preparing the lithium secondary battery precursor according to claim 7; and
subjecting the lithium secondary battery precursor to an aging treatment, thereby obtaining a lithium secondary battery, wherein:
the aging treatment comprises charging and discharging the lithium secondary battery precursor in an environment of from 20° C. to 60° C.

9. The additive for a lithium secondary battery according to claim 1, wherein $R^{10}$ is a fluorine atom, or a perfluoroalkyl group having from 1 to 3 carbon atoms.

10. The additive for a lithium secondary battery according to claim 1, wherein $R^{10}$ is a trifluoromethyl group.

11. The additive for a lithium secondary battery according to claim 1, wherein each of $R^1$, $R^2$, and $R^3$ independently represents a methyl group, an ethyl group, an n-propyl group, an isopropyl group, an n-butyl group, an isobutyl group, a sec-butyl group, a tert-butyl group, a vinyl group, an allyl group, an ethynyl group, or a phenyl group.

12. The additive for a lithium secondary battery according to claim 1, which is a lithium borate compound represented by the following Formula (II), the following Formula (III), the following Formula (IV), or the following Formula (V):

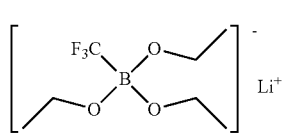
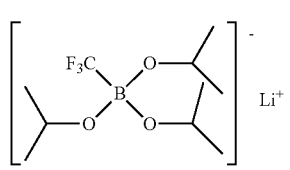
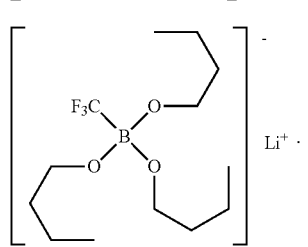
* * * * *